United States Patent
Kohno et al.

(10) Patent No.: US 7,502,818 B2
(45) Date of Patent: Mar. 10, 2009

(54) DATA COMMUNICATIONS SYSTEM, DATA SENDER, DATA RECEIVER, DATA COMMUNICATIONS METHOD, AND COMPUTER PROGRAM

(75) Inventors: Michinari Kohno, Tokyo (JP); Eisaburo Itakura, Kanagawa (JP)

(73) Assignee: Sony Corporation, Tokyo (JP)

( * ) Notice: Subject to any disclaimer, the term of this patent is extended or adjusted under 35 U.S.C. 154(b) by 761 days.

(21) Appl. No.: 10/315,383

(22) Filed: Dec. 10, 2002

(65) Prior Publication Data
US 2003/0126238 A1 Jul. 3, 2003

(30) Foreign Application Priority Data
Dec. 12, 2001 (JP) ............................ P2001-378808

(51) Int. Cl.
*G06F 15/16* (2006.01)
(52) U.S. Cl. ...................................... 709/203; 709/231
(58) Field of Classification Search ................. 709/223, 709/224, 225, 231, 232, 203
See application file for complete search history.

(56) References Cited

U.S. PATENT DOCUMENTS

| 5,844,918 | A | 12/1998 | Kato |
| 6,278,716 | B1 * | 8/2001 | Rubenstein et al. ......... 370/432 |
| 6,392,705 | B1 * | 5/2002 | Chaddha ................. 348/388.1 |
| 6,594,798 | B1 * | 7/2003 | Chou et al. ................. 714/820 |
| 6,711,614 | B1 | 3/2004 | Suzuki |
| 6,745,364 | B2 * | 6/2004 | Bhatt et al. ................. 714/774 |
| 6,778,553 | B1 * | 8/2004 | Chou ......................... 370/465 |
| 6,792,470 | B2 | 9/2004 | Hakenberg et al. |
| 6,914,898 | B2 | 7/2005 | Sasagawa et al. |
| 2002/0004838 | A1 * | 1/2002 | Hakenberg et al. .......... 709/231 |
| 2002/0042836 | A1 * | 4/2002 | Mallory ...................... 709/232 |
| 2002/0136217 | A1 * | 9/2002 | Christensen ................ 370/393 |
| 2003/0018794 | A1 * | 1/2003 | Zhang et al. ................ 709/231 |

FOREIGN PATENT DOCUMENTS

| JP | 11-004216 | 1/1999 |
| JP | 2000-188609 | 7/2000 |

\* cited by examiner

*Primary Examiner*—John Follansbee
*Assistant Examiner*—Alan S Chou
(74) *Attorney, Agent, or Firm*—Bell, Boyd & Lloyd LLP

(57) ABSTRACT

A data communications system is provided to dynamically change the error processing between an ARQ function and an FEC function in accordance with the network status, thus enabling high-quality data playback. In packet transmission, error correction control is performed on the basis of the network status monitored by a network monitoring unit. The error control mode is switched between FEC-based error control and ARQ-based error control (retransmission request processing) in accordance with packet loss or error occurrence on the network, and packet transmission is performed. If the RTT is short, error correction based on ARQ is selected. If the RTT is long, error correction not based on ARQ but on FEC is selected. Such dynamic error correction control is achieved.

39 Claims, 16 Drawing Sheets

FIG. 5

| LAYER | RTP PAYLOAD HEADER | IP HEADER |
|---|---|---|
| LAYER 0 | 0 | 0 |
| LAYER 1 | 1 | 1 |
| LAYER 2 | 2 | 1 |
| LAYER 3 | 3 | 2 |
| LAYER 4 | 4 | 2 |

FIG. 7

| VERSION | HEADER LENGTH | TOS | LENGTH | |
|---|---|---|---|---|
| IDENTIFIER | | | FLAG | FRAGMENT OFFSET |
| TTL | | PROTOCOL | HEADER CHECKSUM | |
| SOURCE IP ADDRESS | | | | |
| DESTINATION IP ADDRESS | | | | |
| OPTION | | | | |

FIG. 10

| DEFINED NAME | VALUE | FUNCTION |
|---|---|---|
| NACK_OPT_SINGLE | 0 | RETRANSMIT ONLY SPECIFIED PACKET (DEFAULT) |
| NACK_OPT_FORWARD | 1 | RETRANSMIT ALL PACKETS FROM BEGINNING OF FRAME TO SPECIFIED NUMBER |
| NACK_OPT_BACKWARD | 2 | RETRANSMIT ALL PACKETS FROM SPECIFIED NUMBER TO END OF FRAME |
| NACK_OPT_ALL | 3 | RETRANSMIT ALL PACKETS WITH SPECIFIED TIMESTAMP |
| NACK_OPT_IGNTS | 4 | IGNORE TIMESTAMPS, SEARCH FOR PACKETS WITH SPECIFIED NUMBER, AND RETRANSMIT DETECTED PACKETS |

FIG. 12A

| HEAD | FORMAT | PACKET TYPE | PACKET LENGTH |
|---|---|---|---|
| TRANSMISSION SYNCHRONIZATION SOURCE IDENTIFIER (RTCP), etc. | | | |
| ECHO-ID | | | |

FIG. 12B

| HEAD | FORMAT | PACKET TYPE | PACKET LENGTH |
|---|---|---|---|
| TRANSMISSION SYNCHRONIZATION SOURCE IDENTIFIER (RTCP), etc. | | | |
| ECHO-ID | | | |
| SERVER PROCESSING TIME | | | |

FIG. 13

| HEAD | FORMAT | PACKET TYPE | PACKET LENGTH |
|---|---|---|---|
| | TRANSMISSION SYNCHRONIZATION SOURCE IDENTIFIER (RTCP), etc. |||
| | TIMESTAMP |||

DATA COMMUNICATIONS SYSTEM, DATA SENDER, DATA RECEIVER, DATA COMMUNICATIONS METHOD, AND COMPUTER PROGRAM

BACKGROUND OF THE INVENTION

The present invention relates to data communications systems, data senders, data receivers, data communications methods, and computer programs. More particularly, the present invention relates to a data communications system having a more error-resilient packet sending scheme in streaming data transmission and to a data sender, a data receiver, a data communications method, and a computer program.

Nowadays, transmission of data including images and audio data via various communications media such as the Internet has become popular and widely performed. In particular, recent data transmission over the Internet has been offering an increasing number of streaming transmission services in addition to download transmission services. When transmitting multimedia data such as a video file or an audio file, download transmission involves downloading the data file from a distributing server into a storage medium at a receiver and subsequently reading the data from the storage medium. Download transmission does not enable the file to be played until the file has been completely transmitted, which makes it unsuitable for long-time playback or real-time playback.

In contrast, the latter, namely, streaming transmission, involves reading received data while the data is being transmitted from a sender to a receiver. Streaming transmission is widely used by Internet services including Internet telephony, remote videoconferencing, and video-on-demand.

Streaming transmission has been used and developed in systems involving storing, for example, an MPEG (Moving Picture Experts Group) stream, which is generated by MPEG-compression of image data, in IP (Internet Protocol) packets, transmitting the packets over the Internet, and receiving the packets by communications terminals, including personal computers (PCs), personal digital assistants (PDAs), and cellular phones. Streaming transmission is advantageous in performing video-on-demand, streaming distribution of live video images, and real-time communications including videoconferencing and videophones.

One Internet technique suitable for such streaming transmission is the Realtime Transport Protocol (RTP), which is defined in the Internet Engineering Task Force (IETF) Request For Comments (RFC) 1889. RTP-compliant data transmission adds a timestamp serving as time information to a packet. With reference to the timestamp, the time relationship between the sender and the receiver is determined. The receiver reads the data in synchronization without being influenced by delay fluctuations in packet transmission (jitter).

RTP does not ensure real-time data transmission. Since the transport service provided by RTP does not have control over prioritization, setting, and management of packet distribution, RTP packets, as in other packets, may be distributed at a delayed time or may be lost on the network. In case of such errors, the receiver can use only the packets that have arrived within the expected time and read their data. Even if video data or audio data is defective, the data can be read with degraded quality or by compensating for the lack of data.

Packets which are not on time for being read and which are distributed at a delayed time or packets with errors are discarded by the receiver. In other words, in case of packet loss or error, even when the sender performs high-quality data distribution, the receiver may not be able to read the data while maintaining the quality. In particular, when there are errors greater than or equal to $10^{-5}$ in wired sections or $10^{-3}$ in wireless sections, RTP-compliant data transmission has a problem maintaining the quality of distributed media.

One scheme for solving the problem in RTP-compliant data transmission involves transmission of a packet retransmission request and a retransmission packet in accordance with the TCP (Transmission Control Protocol), which is highly reliable in data transmission. Although TCP has a high error resilience, TCP has a low throughput and large delay. When a packet is retransmitted, the packet may not be on time for being read. This makes it difficult to implement real-time communications.

One possible error correction technique for correcting packet errors is, for example, forward error correction (FEC). FEC transmits FEC data serving as redundant data for performing error correction. In case of an error, the receiver corrects the error on the basis of the FEC data. BCH (Bose-Chaudhuri-Hochquenghem) codes and convolutional codes are used as random error correcting codes. Generally, Reed-Solomon (RS) codes are often used as burst error correcting codes. FEC is advantageous over automatic repeat request (ARQ) in that FEC has a reduced delay time since there is no delay caused by retransmission. However, FEC adds redundant data, and FEC thus has a lower throughput in transmission paths having a very low packet loss.

FEC involves complicated error correction and coding processing at the receiver side and is thus dependent on the throughput of the receiver. Determination and transmission of unique and optimal FEC data in accordance with the network status and the receiver is difficult to implement. It is always necessary to consider processing-time overhead.

SUMMARY OF THE INVENTION

Accordingly, it is an object of the present invention to provide a data communications system for efficiently performing data transmission in which real-time playback is desired, such as in video-on-demand or remote videoconferencing, and implementing high-quality data playback by suppressing quality degradation in case of an error such as packet loss, and to provide a data sender, a data receiver, a data communications method, and a computer program.

According to an aspect of the present invention, a data communications system for performing streaming data transmission is provided. The data communications system includes a data sender and a data receiver. The data sender includes a packet sending processor for sending data packets containing data to be sent; a network status monitoring unit for monitoring the network status; a data-sender-side controller for controlling, on the basis of the network status monitored by the network status monitoring unit, an error control mode for the transmitted packets; and a retransmission controller for extracting a data packet to be retransmitted in accordance with a retransmission request message packet received from the data receiver. The data receiver includes a packet reception processor for receiving the data packets from the data sender; an error correction controller for detecting an error or packet loss in the data packets received from the data sender and performing error-compliant processing; and a retransmission request controller for determining, on the basis of the detection of the error or packet loss in the data packets received from the data sender, whether to send the retransmission request message packet serving as a data packet retransmission request to the data sender.

The data-sender-side controller may change, on the basis of the network status monitored by the network status monitoring unit, the processing mode of forward error correction (FEC) serving as error control or the processing mode of automatic repeat request (ARQ) serving as data retransmission request processing.

The network status monitoring unit may analyze the network status on the basis of a packet loss rate, transmission delay time, or the retransmission request from the data receiver and output the analysis result to the data-sender-side controller, and the data-sender-side controller may control the error control mode for the transmitted packets on the basis of the analysis result.

The data receiver may further include a data-receiver-side network status monitoring unit for monitoring the network status. The data-receiver-side network status monitoring unit may analyze the network status on the basis of a packet loss rate or transmission delay time and select data to be processed on the basis of the analysis result.

The data sender may further include a hierarchization unit for organizing encoded data to be sent into hierarchical layers; and a prioritization processor for specifying priority levels for the hierarchical layers generated by the hierarchization unit. The data receiver may further include a data-receiver-side network status monitoring unit for monitoring the network status; and a layer selection controller for selecting, in accordance with the hierarchy or priority, data to be processed on the basis of the analysis result by the data-receiver-side network status monitoring unit.

The error correction controller of the data receiver may perform error correction based on forward error correction (FEC) serving as error control or automatic repeat request (ARQ) serving as data retransmission request processing. The error correction controller of the data receiver may control sending of an ECHO packet to the data sender and reception of an ECHO-REPLY packet in response to the ECHO packet in order to compute a round trip time (RTT) between the data sender and the data receiver. On the basis of the RTT computed based on the ECHO packet, it may be determined whether reception of a retransmitted data packet in response to the retransmission request is feasible prior to the start of reading data stored in the retransmitted data packet.

The data sender may further include a hierarchization unit for organizing encoded data to be sent into hierarchical layers; and a prioritization processor for specifying priority levels for the hierarchical layers generated by the hierarchization unit. The data-sender-side controller may change the hierarchization mode of the hierarchization unit or the processing mode of the prioritization processor in accordance with the network status.

The data sender may further include a hierarchization unit for organizing encoded data to be sent into hierarchical layers. The data-sender-side controller may change, on the basis of the network status monitored by the network status monitoring unit, the processing mode of forward error correction (FEC) serving as error control or the processing mode of automatic repeat request (ARQ) serving as data retransmission request processing in accordance with each of the hierarchical layers generated by the hierarchization unit.

The data sender may further include a hierarchization unit for organizing encoded data to be sent into hierarchical layers; and a prioritization processor for specifying priority levels for the hierarchical layers generated by the hierarchization unit. The data-sender-side controller may change, on the basis of the network status monitored by the network status monitoring unit, the processing mode of forward error correction (FEC) serving as error control or the processing mode of automatic repeat request (ARQ) serving as data retransmission request processing in accordance with each of the priority levels specified by the prioritization processor.

According to a second aspect of the present invention, a data sender for sending streaming data is provided including a packet sending processor for sending data packets containing data to be sent; a network status monitoring unit for monitoring the network status; a data-sender-side controller for controlling, on the basis of the network status monitored by the network status monitoring unit, an error control mode for the transmitted packets; and a retransmission controller for extracting a data packet to be retransmitted in accordance with a retransmission request message packet received from a data receiver.

The data-sender-side controller may change, on the basis of the network status monitored by the network status monitoring unit, the processing mode of forward error correction (FEC) serving as error control or the processing mode of automatic repeat request (ARQ) serving as data retransmission request processing. The network status monitoring unit may analyze the network status on the basis of a packet loss rate, transmission delay time, or the retransmission request from the data receiver and output the analysis result to the data-sender-side controller, and the data-sender-side controller may control the error control mode for the transmitted packets on the basis of the analysis result.

The data sender may further include a hierarchization unit for organizing encoded data to be sent into hierarchical layers; and a prioritization processor for specifying priority levels for the hierarchical layers generated by the hierarchization unit. The data-sender-side controller may change the hierarchization mode of the hierarchization unit or the processing mode of the prioritization processor in accordance with the network status. The data sender may further include a hierarchization unit for organizing encoded data to be sent into hierarchical layers. The data-sender-side controller may change, on the basis of the network status monitored by the network status monitoring unit, the processing mode of forward error correction (FEC) serving as error control or the processing mode of automatic repeat request (ARQ) serving as data retransmission request processing in accordance with each of the hierarchical layers generated by the hierarchization unit.

The data sender may further include a hierarchization unit for organizing encoded data to be sent into hierarchical layers; and a prioritization processor for specifying priority levels for the hierarchical layers generated by the hierarchization unit. The data-sender-side controller may change, on the basis of the network status monitored by the network status monitoring unit, the processing mode of forward error correction (FEC) serving as error control or the processing mode of automatic repeat request (ARQ) serving as data retransmission request processing in accordance with each of the priority levels specified by the prioritization processor.

In accordance with a third aspect of the present invention, a data receiver for receiving streaming data is provided including a packet reception processor for receiving data packets from a data sender; a network status monitoring unit for monitoring the network status; an error correction controller for detecting an error or packet loss in the data packets received from the data sender and performing error-compliant processing; a retransmission request controller for determining, on the basis of the detection of the error or packet loss in the data packets received from the data sender, whether to send a retransmission request message packet serving as a data packet retransmission request to the data sender; and a layer selection controller for selecting data to be processed on the basis of the monitoring result by the network status monitoring unit.

The network status monitoring unit may analyze the network status on the basis of a packet loss rate or transmission delay time, and the layer selection controller may select the data to be processed on the basis of the analysis result. The error correction controller of the data receiver may perform error correction based on forward error correction (FEC) serving as error control or automatic repeat request (ARQ) serving as data retransmission request processing. The error correction controller of the data receiver may control sending of an ECHO packet to the data sender and reception of an ECHO-REPLY packet in response to the ECHO packet in order to compute a round trip time (RTT) between the data sender and the data receiver. On the basis of the RTT computed based on the ECHO packet, it may be determined whether reception of a retransmitted data packet in response to the retransmission request is feasible prior to the start of reading data stored in the retransmitted data packet.

In accordance with a fourth aspect of the present invention, a data communications method for performing streaming data transmission between a data sender and a data receiver is provided. The data sender performs a packet sending step of sending data packets containing data to be sent; a network status monitoring step of monitoring the network status; a data-sender-side controlling step of controlling, on the basis of the network status monitored in the network status monitoring step, an error control mode for the transmitted packets; and a retransmission controlling step of extracting a data packet to be retransmitted in accordance with a retransmission request message packet received from the data receiver. The data receiver performs a packet receiving step of receiving the data packets from the data sender; an error correction controlling step of detecting an error or packet loss in the data packets received from the data sender and performing error-compliant processing; and a retransmission request controlling step of determining, on the basis of the detection of the error or packet loss in the data packets received from the data sender, whether to send the retransmission request message packet serving as a data packet retransmission request to the data sender.

The data-sender-side controlling step may change, on the basis of the network status monitored in the network status monitoring step, the processing mode of forward error correction (FEC) serving as error control or the processing mode of automatic repeat request (ARQ) serving as data retransmission request processing. The network status monitoring step may analyze the network status on the basis of a packet loss rate, transmission delay time, or the retransmission request from the data receiver, and the data-sender-side controlling step may control the error control mode for the transmitted packets on the basis of the analysis result.

The data receiver may further perform network status monitoring for analyzing the network status on the basis of a packet loss rate or transmission delay time and select data to be processed on the basis of the monitoring result. The data sender may further perform a hierarchization step of organizing encoded data to be sent into hierarchical layers; and a prioritization processing step of specifying priority levels for the hierarchical layers generated in the hierarchization step. The data receiver may further perform a layer selection controlling step of selecting, in accordance with the hierarchy or priority, data to be processed on the basis of the network status.

The error correction controlling step performed by the data receiver may perform error correction based on forward error correction (FEC) serving as error control or automatic repeat request (ARQ) serving as data retransmission request processing. The error correction controlling step performed by the data receiver may further include a sending/reception step of sending an ECHO packet to the data sender and receiving an ECHO-REPLY packet in response to the ECHO packet in order to compute a round trip time (RTT) between the data sender and the data receiver; and a determination step of determining, on the basis of the RTT computed based on the ECHO packet, whether reception of a retransmitted data packet in response to the retransmission request is feasible prior to the start of reading data stored in the retransmitted data packet.

The data sender may further perform a hierarchization step of organizing encoded data to be sent into hierarchical layers; and a prioritization processing step of specifying priority levels for the hierarchical layers generated in the hierarchization step. The data-sender-side controlling step may change the hierarchization mode or the prioritization mode in accordance with the network status. The data sender may further perform a hierarchization step of organizing encoded data to be sent into hierarchical layers. The data-sender-side controlling step may change, on the basis of the network status, the processing mode of forward error correction (FEC) serving as error control or the processing mode of automatic repeat request (ARQ) serving as data retransmission request processing in accordance with each of the hierarchical layers.

The data sender may further perform a hierarchization step of organizing encoded data to be sent into hierarchical layers; and a prioritization processing step of specifying priority levels for the hierarchical layers generated in the hierarchization step. The data-sender-side controlling step may change, on the basis of the network status, the processing mode of forward error correction (FEC) serving as error control or the processing mode of automatic repeat request (ARQ) serving as data retransmission request processing in accordance with each of the priority levels.

In accordance with a fifth aspect of the present invention, a computer program for sending streaming data is provided including a packet sending step of sending data packets containing data to be sent; a network status monitoring step of monitoring the network status; a control step of controlling, on the basis of the network status monitored in the network status monitoring step, an error control mode for the transmitted packets; and a retransmission controlling step of extracting a data packet to be retransmitted in accordance with a retransmission request message packet received from a data receiver.

In accordance with a sixth aspect of the present invention, a computer program for receiving streaming data is provided including a packet receiving step of receiving data packets from a data sender; an error correction controlling step of detecting an error or packet loss in the data packets received from the data sender and performing error-compliant processing; a retransmission request controlling step of determining, on the basis of the detection of the error or packet loss in the data packets received from the data sender, whether to send a retransmission request message packet serving as a data packet retransmission request to the data sender; and a layer selection controlling step of selecting data to be processed on the basis of the monitoring result in the network status monitoring unit.

A computer program of the present invention can be provided to a general computer system capable of performing various program codes from a storage medium or a communications medium for providing the computer program in a computer-readable format. The storage medium includes, for example, a recording medium such as a compact disc (CD), a floppy disk (FD), or a magneto-optical (MO) disc. The communications medium includes, for example, a network. By providing such a computer-readable program, the processing in accordance with the program is executed on the computer system.

It should be noted that the word "system" in this specification refers to a logical set of a plurality of apparatuses, and the apparatuses need not be contained in the same casing.

Additional features and advantages of the present invention are described in, and will be apparent from, the following Detailed Description of the Invention and the figures.

BRIEF DESCRIPTION OF THE DRAWINGS

FIG. 5 is a diagram describing a map used in prioritization performed by the sender in the data communications system of the present invention;

FIG. 7 is a diagram showing the format of an IP packet header transmitted in the data communications system of the present invention;

FIG. 10 is a diagram showing the functions of option values in the NACK-RTCP packet transmitted in the data communications system of the present invention;

FIG. 12A is a diagram showing the format of an ECHO-RTCP packet transmitted in the data communications system of the present invention;

FIG. 12B is a diagram showing the format of an ECHO-REPLY-RTCP packet transmitted in the data communications system of the present invention;

FIG. 13 is a diagram showing the format of an EOS (End Of Stream)—RTCP packet transmitted in the data communications system of the present invention;

DESCRIPTION OF THE PREFERRED EMBODIMENTS

Figure 1:
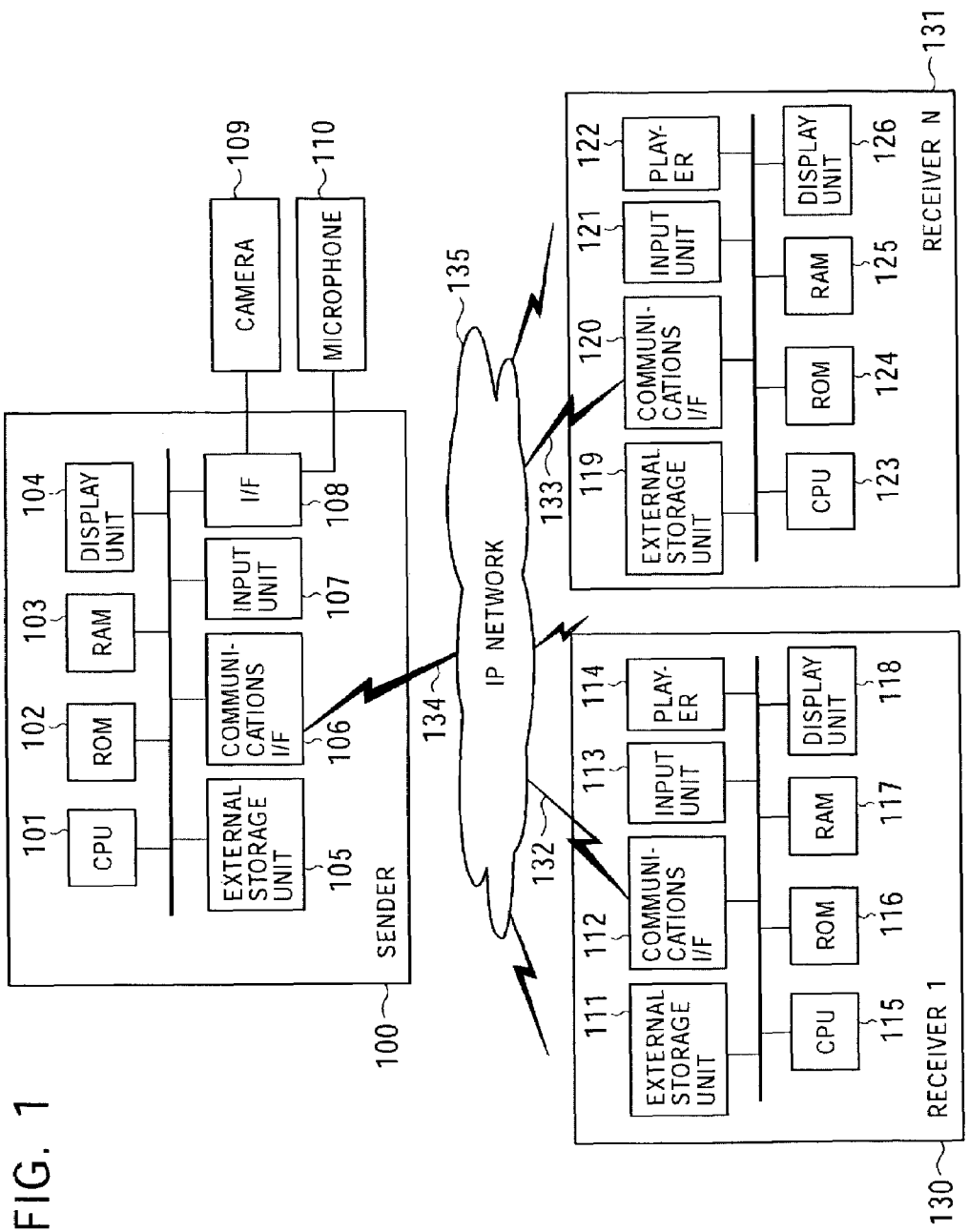
FIG. 1 is a block diagram illustrating the configuration of a data communications system of the present invention.

FIG. 1 shows an example of the system configuration of a data communications system of the present invention. The data communications system of the present invention performs data transmission in which real-time playback is desired, such as in video-on-demand and remote videoconferencing, using a sender 100 for sending data and receivers 130 and 131 for receiving data via an IP network 135.

Although one sender 100 and two receivers 130 and 131 are shown in FIG. 1, an arbitrary number of senders and receivers perform data sending and reception via the IP network 135. Alternatively, the senders and receivers can be configured as those capable of both sending and receiving data, instead of only sending data or only receiving data. The sender 100 obtains media data, such as images and audio, from a camera 109 and a microphone 110 and stores the media data via an interface (I/F) 108 in a storage unit 105 and a RAM (Random Access Memory) 103. The obtained data is transmitted via a communications interface 106 to the IP network 135. Transmission paths 132, 133, and 134 configured via the IP network 135 may be wired or wireless. The receiver 130 receives the data via the transmission paths 132, 133, and 134 and a communications interface 112, and the receiver 130 buffers the data in a RAM 117.

In the receiver 130, the data is processed by a CPU (Central Processing Unit) 115, and the received data is displayed as an image by a display unit 118 and played as audio by a player 114. As in the receiver 130, the receiver 131 receives the data from the sender 100 at the same time as the receiver 130 and similarly displays an image and plays audio.

In the configuration shown in FIG. 1, the sender 100 and the receivers 130 and 131 are each formed of a PC with a communications function or a mobile terminal. Although the detailed configuration of each of the sender 100 and the receivers 130 and 131 is described later, the function of each processor in the sender 100 and the receivers 130 and 131 shown in FIG. 1 is schematically described below.

CPUs 101, 115, and 123 are processors for executing various executing programs and an OS (Operating System) and will be described later. The CPUs 101, 115, and 123 execute programs for controlling retransmission of transmitted/received data and error correction. ROMs (Read-Only-Memories) 102, 116, and 124 store the programs executed by the CPUs 101, 115, and 123 or fixed data serving as arithmetic parameters. RAMs 102, 117, and 125 are used as storage areas and work areas for storing the programs executed by the CPUs 101, 115, and 123 and parameters changing in accordance with the processing of the programs.

Display units 104, 118, and 126 are formed of, for example, CRTs (Cathode Ray Tubes) or LCDs (Liquid Crystal Displays) and display various information in the form of text or images. External storage units 105, 111, and 119 have storage media such as a hard disk, a digital versatile disk (DVD), or the like and store various data and programs. Communications interfaces 106, 112, and 120 implements communications between the sender 100 and the receivers 130 and 131. Under the control of the CPUs 101, 115, and 123, the communications interfaces 106, 112, and 120 send data supplied from each storage unit or data processed by each CPU or receive data from another terminal.

Input units 107, 113, and 121 include, for example, keyboards and pointing devices. Data or a command can be input by a user through the keyboard or mouse. Players 114 and 122 in the receivers 130 and 131 are, for example, as described above, speakers for playing audio.

Figure 2:
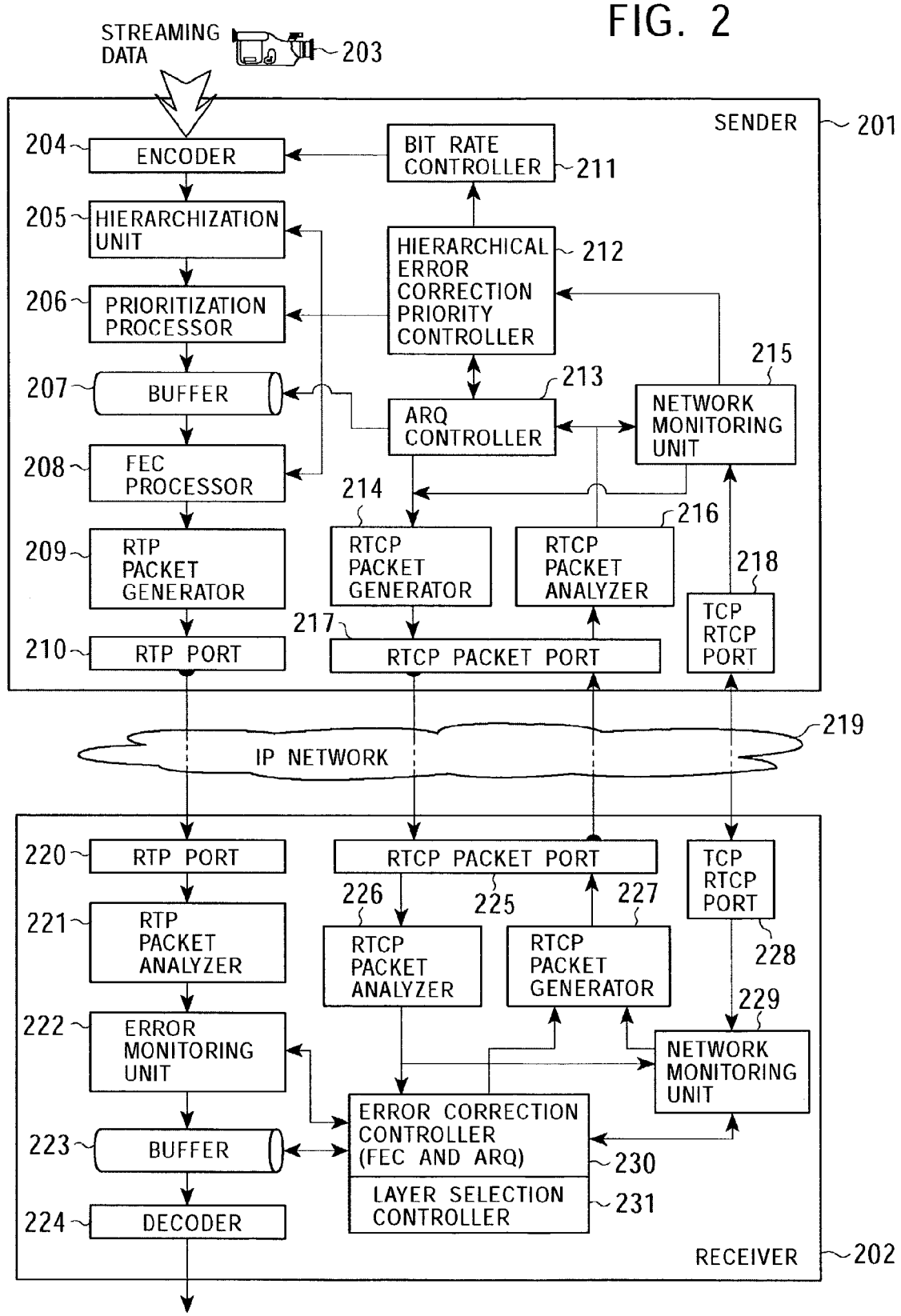
FIG. 2 is a block diagram illustrating the configuration including a sender and a receiver in the data communications system of the present invention.

Referring to FIG. 2, data sending and reception in the data communications system of the present invention will now be described in detail. In the data communications system shown in FIG. 2, a sender 201 packetizes data such as an image or audio and sends the data packets to a receiver 202. The transmitted data is, for example, an image or audio data captured by, for example, a video camera 203. The transmitted data may include data input from a storage medium such as a CD or a DVD or data received from an external network or a satellite. In the following description, a case in which moving image data captured by the video camera 203 is transmitted from the sender 201 to the receiver 202 will be described.

The moving image data captured by the video camera 203 is encoded by an encoder 204 in the sender 201 using, for example, the MPEG compression technique. In accordance with the data to be sent and the reading capability of the receiver 202, a hierarchization unit 205 organizes the data into hierarchical layers, and a prioritization processor 206 specifies priority levels for the hierarchical layers. The hierarchization unit 205 organizes the encoded data into hierarchical layers. The base layer serves as the basis of the image. Even when the receiver 202 receives only the base layer, the minimum quality is ensured. Reception of upper-layer data allows the receiver 202 to read higher-quality data (image). As discussed above, the hierarchization unit 205 performs hierarchization in accordance with the encoded data.

In video-on-demand or streaming distribution of live video images or in real-time communications including videoconferencing and videophones, it is necessary to assume that data sending and reception is performed by receivers with different capabilities. For example, data sent from one information source is received by a receiver such as a cellular phone having a low-resolution display and a low-throughput CPU, and the data is displayed. At the same time, the same data is received by a receiver such as a desk-top PC having a high-resolution monitor and a high-throughput CPU, and the data is displayed. In this manner, data is sent to various receivers having different throughputs. In order to enable each receiver to receive and display data in accordance with the corresponding throughput, hierarchical encoding of data to be sent/received is performed. As discussed above, the hierarchization unit 205 performs hierarchization in accordance with the encoded data.

By distributing data that has been hierarchically encoded, for example, two types of encoded data, that is, encoded data to be processed only by a receiver having a high-resolution display and encoded data to be commonly processed by both a receiver having a high-resolution display and a receiver having a low-resolution display, are distinguishably packetized and distributed. At the receiver side, the data is selected and processed.

Compression/decompression schemes for performing hierarchical encoding include, for example, MPEG-4 and JPEG-2000 video streams. MPEG-4 is scheduled to adopt a fine granularity scalability technique into the standard and profile the standard. With this hierarchical encoding technique, scalable distribution from a low bit rate to a high bit rate will be made possible. JPEG-2000, which is based on the wavelet transform, utilizes the features of the wavelet transform and performs packetization based on the spatial resolution or hierarchical packetization based on the image quality. With the Motion JPEG-2000 (Part 3) standard, which is capable of processing not only still images but also moving images, layered data is stored in a file format. By adopting the above-described hierarchical encoding, simultaneous distribution of data from one file to receives with different throughputs is made possible.

Another example of hierarchical encoding is a technique based on a discrete cosine transform (DCT). This technique involves DCT-processing of, for example, image data serving as information to be distributed, thus organizing the data into layers in which high frequencies and low frequencies are distinguished, creating different packets for the high-frequency layers and the low-frequency layers, and distributing the data packets. The encoder 204 performs hierarchical encoding such as the above-described DCT processing or wavelet transform.

The encoder 204 performs the above-described hierarchical encoding by progressive encoding in a preset progressive sequence. In other words, the encoder 204 performs progressive encoding in accordance with various data layers in a progressive sequence based on the spatial resolution corresponding to the above-described wavelet transform, a progressive sequence corresponding to layers based on signal to noise ratio (SNR), i.e., image quality, or a progressive sequence corresponding to layers based on color components (RGB or YCbCr).

Progressive encoding is widely used in distribution of images and the like over the Internet. The receiver first outputs rough image data, and, subsequently, outputs finer images one after another to be displayed. For example, progressive encoding based on the spatial resolution generates high-frequency encoded image data corresponding to a fine image from low-frequency encoded image data corresponding to a rough image. The receiver for decoding and displaying the data first decodes and displays the low-frequency encoded image data, thus displaying a rough outline image on a display in a short period of time. Subsequently, the receiver decodes and displays the high-frequency encoded data. As a result, an image that gradually becomes finer is displayed. In SNR-based (that is, quality-based) progressive encoding, high SNR (high image quality) data and low SNR (low image quality) data are distinguishably encoded from each other. In color-component-based (RGB or YCbCr) progressive encoding, the color components (RGB or YCbCr) are individually encoded.

Figure 3:
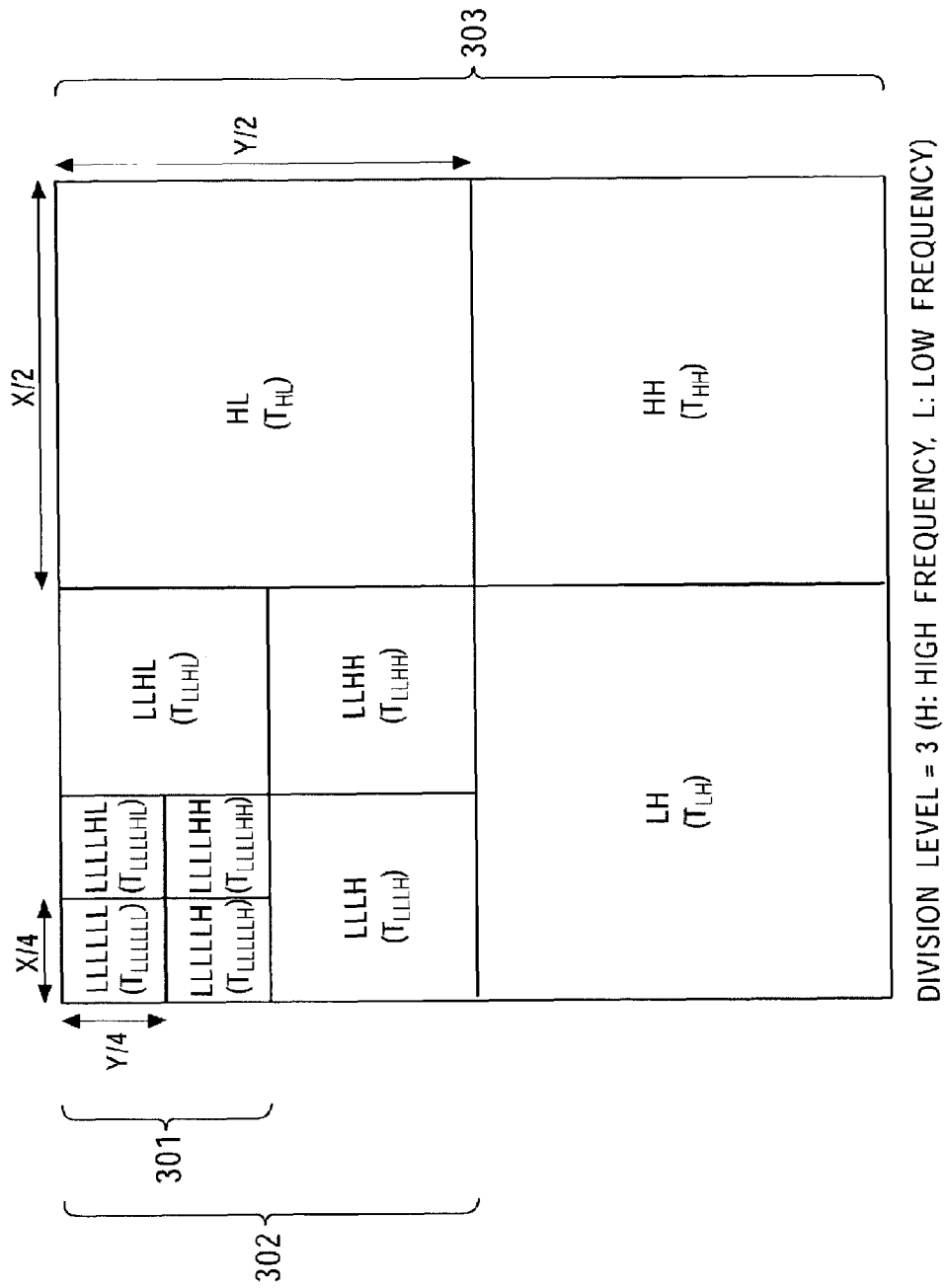
FIG. 3 illustrates a wavelet transform serving as an example of data hierarchization.

A case in which the encoded data is organized into layers by the wavelet transform will now be described. The wavelet transform separates an input image signal into subbands multiple times using a low-pass filter and a high-pass filter and sequentially generates band components by hierarchically separating a low-frequency component into subbands. FIG. 3 illustrates band components generated by separating a two-dimensional image into subbands up to level 3. In this example shown in FIG. 3, the image is divided by level-1 band separation (in horizontal and vertical directions) into four components LL, LH, HL, and HH, where LL denotes that both horizontal and vertical components are L, and LH denotes that the horizontal component is L and the vertical component is H. The LL component is again divided into LLLL, LLHL, LLLH, and LLHH. The LLLL component is again divided into LLLLLL, LLLLHL, LLLLLH, and LLLLHH.

The encoder 204 shown in FIG. 2 performs the hierarchical encoding, such as the above-described wavelet transform. The hierarhization unit 205 organizes the encoded data into hierarchical layers. The prioritization processor 206 specifies priority levels for the hierarchical layers. The encoder 204 changes the encoding mode, such as the number of encoded layers, on the basis of information from a bit rate controller 211. The bit rate controller 211 sets the encoding mode of the encoder 204 on the basis of information set by a hierarchical error correction priority controller 212 which receives the network status monitored by a network monitoring unit 215.

For example, the network monitoring unit 215 detects a packet delay due to network congestion, and the encoder 204 dynamically changes the encoding mode, such as the number of encoded layers, on the basis of the detected information.

The prioritization processor 206 specifies priority levels for the hierarchical layers of the encoded data according to importance. When the data is organized into hierarchical levels by the wavelet transform based on the spatial resolution, the most important hierarchical level corresponds to data required to display a rough outline image on the display. This corresponds to encoded areas including low-frequency (3LL) data shown in FIG. 3, that is, ⅛-sized LLLLLL, LLLLHL, LLLLLH, and LLLLHH data areas 301. The next important hierarchical level corresponds to next-low-frequency ¼-sized data areas, that is, LLLL, LLHL, LLLH, and LLHH data areas 302. The next important hierarchical level corresponds to next-low-frequency ½-sized data areas, that is, LL, LH, HL, and HH data areas 303.

The prioritization processor 206 dynamically changes the priority levels on the basis of information set by the hierarchical error correction priority controller 212 which receives the network status monitored by the network monitoring unit 215. For example, the network monitoring unit 215 detects a packet delay due to network congestion, and the prioritization processor 206 dynamically changes the priority levels specified for the encoded data layers on the basis of the detected information.

Figure 4:
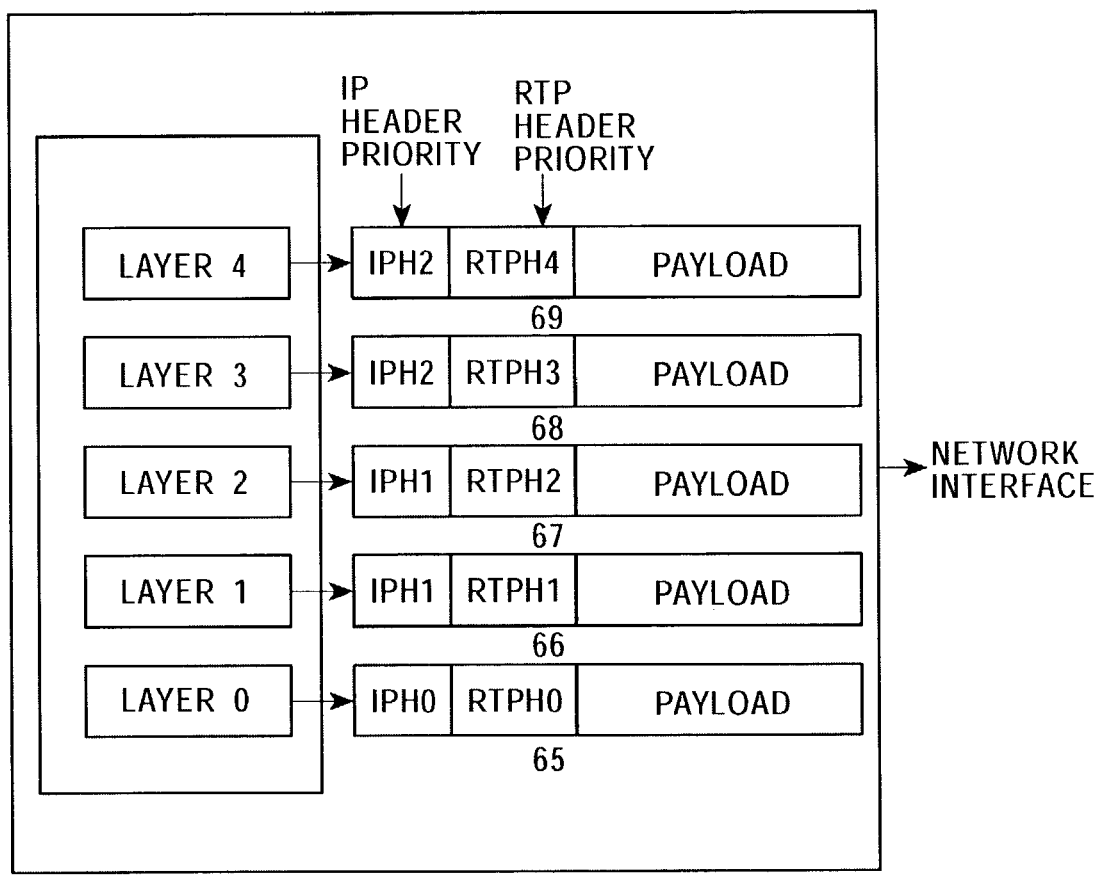
FIG. 4 is a diagram describing an example of prioritization performed by the sender in the data communications system of the present invention.

The priority levels are specified, for example, in a manner shown in FIG. 4. When the encoder 204 performs hierarchical encoding and partitions data into five layers, the encoded data is organized into layers 0 to 4. Layers 0 to 4 are stored in payloads of five IP packets 65 to 69, respectively.

The encoded data in layer 0 is an important data. The priority level "0" is defined in the RTP header (RTPH) of the IP packet 65 whose payload contains the encoded data in layer 0, and the priority level "0" is defined in the IP header (IPH). The encoded data in layer 1 is the next important data. The priority level "1" is defined in the RTP header (RTPH) of the IP packet 66 whose payload contains the encoded data in layer 1, and the priority level "1" is defined in the IP header (IPH). Similarly, the priority level "2" is defined in the RTP header of the IP packet 67 whose payload contains the encoded data in layer 2, and the priority level "1" is defined in the IP header. The priority level "3" is defined in the RTP header of the IP packet 68 whose payload contains the encoded data in layer 3, and the priority level "2" is defined in the IP header. The priority level "4" is defined in the RTP header of the IP packet 69 whose payload contains the encoded data in layer 4, and the priority level "2" is defined in the IP header.

The priority levels are defined in the IP headers and the RTP headers in accordance with a prioritization map stored in a storage unit in the prioritization processor 206. FIG. 5 shows an example of the structure of the prioritization map. In the prioritization map, the priority levels defined in the RTP headers and the IP headers are associated with the layers encoded by the encoder 204.

The example of the prioritization map shown in FIG. 5 directly applies layer levels 0 to 4 set by the wavelet transform as priority levels 0 to 4 to be defined in extension headers of the RTP packets (RTP payload headers subsequent to RTP common headers). There are three types (0 to 2) of priority levels to be defined in the IP headers. In other words, there are three priority levels when viewed from the IP network. As discussed above, association of the layer levels with the priority levels at the RTP level and mapping of the priority from the RTP level to the IP level allow the following control functions.

The sequence number of each packet is managed at the RTP level. When packet loss occurs on the Internet, the lost packet is detectable. Upon detection of the packet loss, the receiver informs, for example, the decoder of the location of packet loss. This changes an error control method. The error control method employed here is, for example, FEC. Possible FEC techniques include performing FEC in response to packet loss at Asynchronous Transfer Mode Adaptation Layer 1 (AAL1) of Asynchronous Transfer Mode (ATM), using a matrix described in ITU-T (Telecommunication standardization sector of International Telecommunications Union) Recommendation I.363.1, B-ISDN ATM AAL types 1 and 2 specification to perform Reed-Solomon decoding of a lost packet, and the like.

Such processing need not be equally performed on packets at all layer levels. For example, the FEC redundancy may be changed in accordance with the network bandwidth. The number of retransmissions may be weighted according to priority.

The prioritization map shown in FIG. 5 is dynamically changed in accordance with the network status. Using band monitoring information generated by the network monitoring unit 215 and information indicating a packet loss rate of transmitted packets detected by RTCP, the mapping is changed in consideration of transmittable bandwidth and assurable quality. When a prioritization map by which the layer levels are mapped to the priority levels of the RTP packets or the priority levels of the IP packets is generated, the priority is determined in consideration of the influence of packet loss on the original image and the network loss rate.

As discussed above, according to the data communications system of the present invention, the priority levels are defined in the RTP payload headers of the RTP headers in accordance with the hierarchical levels of the encoded data. At the RTP packet level, the priority dependent on higher application is detectable. By detecting the priority, the processing in response to packet loss is changed.

Such processing at each hierarchical level is dependent on application. At the RTP packet level, the processing in accordance with the priority level is determined without considering the other levels. Similarly, the processing method can be changed by specifying priority levels at the IP packet level. In this case, at the IP packet level, as in differentiated service (DiffServ), prioritization is a function provided by a network. The network-supported or network-defined priority is specified by mapping the priority from the RTP packet level to the IP packet level.

In the prioritization map shown in FIG. 5, five priority levels are specified at the RTP packet level, and three priority levels are specified at the IP packet level. The RTP packet level 1 corresponds to the IP packet level 1; the RTP packet levels 2 and 3 correspond to the IP packet level 2; and the RTP packet levels 4 and 5 correspond to the IP packet level 3. In the current IPv4 format, DiffServ is capable of handling only a few priority levels. The processing corresponding to three priority levels is feasible by applying such a mapping in this example.

For example, when encoded data is packetized in accordance with a progressive sequence based on resolution, packets storing low-resolution encoded data are classified as higher priority, whereas packets storing high-resolution encoded data are classified as lower priority. The receiver refers to the priority levels defined in the IP headers or the RTP headers of the packets and preferentially processes the lower-frequency packets. For example, when network congestion occurs, the rate at which the corresponding packets are discarded is reduced, and the image quality is thus improved.

The prioritization map can be arranged in various other manners. As discussed above, the application-dependent priority level is defined in the RTP payload header in accordance with the importance of each of the encoded data layers. The priority level may also be defined in the IP header. Using a plurality of pieces of priority information, the error control method may be changed or the rate control may be performed in each layer.

The priority level defined in the RTP payload header can be dynamically changed in accordance with a request from an application or user or receiver information received from the receiver. The priority level defined in the IP header is dynamically changed in accordance with the network status, such as the degree of network congestion. The network monitoring unit 215 of the sender 201 receives information concerning the data reception status at the receiver 202 from the receiver 202. As discussed above, the hierarchical error correction priority controller 212 outputs control information to the corresponding processors 204 to 206 so as to dynamically change the encoding mode of the encoder 204, the hierarchization mode of the hierarhization unit 205, and the prioritization mode of the prioritization processor 206.

As discussed above, the data for which priority levels are specified by the prioritization processor 206 is output to a buffer 207 and stored in the buffer 207. If necessary, an FEC processor 208 adds error-correcting redundant code to the encoded data stored in the buffer 207. Possible FEC techniques include performing FEC in response to packet loss in AAL1 of ATM, using a matrix described in ITU-T Recommendation I.363.1, B-ISDN ATM AAL types 1 and 2 specification to perform Reed-Solomon encoding of a lost packet, and the like. The FEC processor 208 may add the error-correcting redundant code not based on each piece of data but on a plurality of pieces of data so that the error resilience can be enhanced. In other words, the FEC processor 208 may additionally perform interleaving.

The FEC processor 208 is not required to equally add the error-correcting redundant code to packets at all hierarchical levels. Alternatively, the network monitoring unit 215 detects packet delay due to network congestion or network bandwidth, and the FEC processor 208 dynamically changes the processing mode, such as the FEC redundancy, on the basis of the detected information.

As described above, the sender 201 dynamically changes the encoding mode of the encoder 204, the hierarchization mode of the hierarhization unit 205, the prioritization mode of the prioritization processor 206, and the processing mode of the FEC processor 208 on the basis of information from the network monitoring unit 215, that is, information concerning the data reception status at the receiver 202 from the receiver 202 and information concerning the network status.

On the basis of the above-described processing configuration of the sender 201, for example, error correction is performed in each encoded layer. Each encoded layer is allocated to be subjected to FEC processing or ARQ processing. The optimal error correction and throughput are achieved in each layer. In other words, when the transmission path has a high error rate and/or a large delay, that is, when the transmission path is in adverse circumstances with respect to packet retransmission request processing (ARQ), error correction is performed by FEC. In contrast, when the sender 201 does not want to transmit redundant data and a transmission delay is small, error correction not based on FEC but on ARC is performed. As discussed above, data packets to be sent are subjected to error correction selected by the sender 201.

The receiver 202 has a similar network monitoring unit 229. When it is determined that the network status is satisfactory on the basis of information indicating packet delay status in accordance with network congestion or network bandwidth, the receiver 202 dynamically changes the processing mode and reads higher-layer data, thus performing higher-quality data playback.

The description of the configuration of the sender 201 will be continued. The data having the error-correcting redundant code, which is added by the FEC processor 208 if necessary, is output to an RTP packet generator 209 for generating RTP-compliant data packets (hereinafter referred to as packets). The RTP packet generator 209 generates RTP packets containing the encoded data. The RTP packets containing the encoded data, which are generated by the RTP packet generator 209, are sent from an RTP port 210 to an IP network 219 in accordance with the RTP protocol. The packet sending processor is formed of the RTP packet generator 209 and the RTP port 210 of the sender 201.

Figure 6:
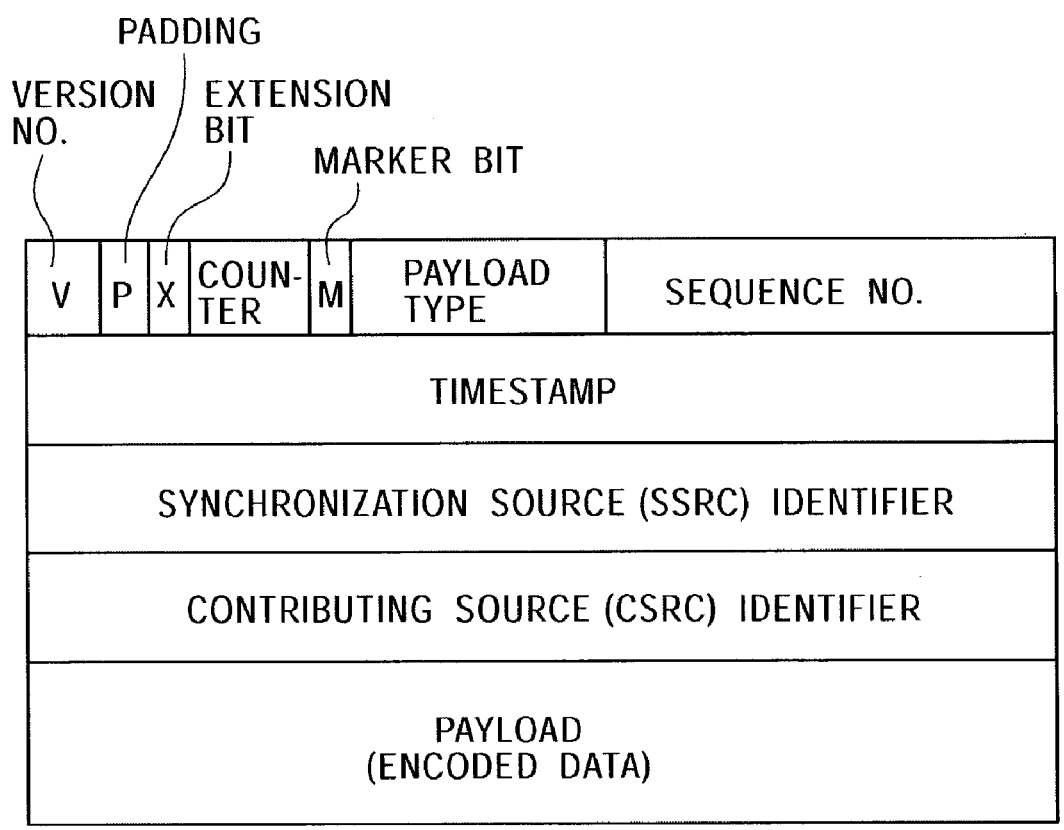
FIG. 6 is a diagram showing the format of an RTP packet transmitted in the data communications system of the present invention.

The RTP packet generator 209 generates the packets containing the encoded data in the payloads. Each packet is generated by adding an RTP header to the payload data. FIG. 6 shows the RTP packet structure. The RTP header contains fields including the version number (V), padding (P), the presence of an extension header (X), the number of sources (counter), marker information (marker bit), payload type, sequence number, timestamp, synchronization source (SSRC) identifier, and contribution source (CSRC) identifier. The receiver 202 refers to the timestamp defined in the RTP header and controls the processing time when the RTP packet is expanded. This enables the receiver 202 to perform real-time image or audio playback. For example, RTP packets containing encoded moving-image data are generated. A common timestamp is added to a plurality of RTP packets belonging to one image frame. In the last packet forming each frame, an identification flag indicating that this is the end of the frame is stored in the RTP header.

An IP header is added to the packet having the RTP header. FIG. 7 shows details of the IP header of the IP packet. The IP header contains the version indicating IPv4, IPv6, etc., header length, TOS (Type of Service) field containing priority information, packet length, packet identifier, flag serving as control information concerning data separation (fragmentation) at the IP layer, fragment offset indicating the location of separated (fragmented) data, TTL (Time to Live) which is time information indicating time left until the data is discarded, upper layer protocol (4:IP, TCP:7, UDP:17 . . . ), header checksum, source IP address, and destination IP address.

Referring back to FIG. 2, data reception will now be described. An RTP port 220 of the receiver 202 receives the RTP packets from the sender 201 via the IP network 219. The received RTP packets are analyzed by an RTP packet analyzer 221. The packet reception processor is formed of the RTP port 220 and the RTP packet analyzer 221 of the receiver 202. Specifically, the RTP packet analyzer 221 analyzes the header and the data of each packet. The data serving as the payload extracted from each packet is checked for a reception packet error at an error monitoring unit 222.

When the error monitoring unit 222 detects no packet loss and the data is thus normally received, the received packets are stored in a buffer 223. Under the time control based on the header information, the received packets are transferred to a decoder 224. The decoder 224 decodes the data packets. For example, each image frame forming a moving image is formed of data contained in a plurality of packets. The same timestamp is added to the headers of a plurality of RTP packets containing data forming one image frame. With reference to the timestamp in the header information, packets having the same timestamp are transferred as a set of encoded data forming one image frame to the decoder 224. The decoder 224 decodes the data in each frame. The data decoded by the decoder 224 is transferred to a display or a speaker serving as a player and thus output.

When all packets are transmitted from the sender 201 to the receiver 202 without delay or error, the receiver 202 performs real-time data playback without any problem. On the other hand, however, reading errors or quality degradation of read data may occur due to various factors including packet loss and delay on the network and data errors in transmitted packets.

In the data communications system of the present invention, when packet loss is detected by the error monitoring unit 222, an error correction controller 230 determines whether the error can be corrected by FEC. If the error can be corrected by FEC, the error correction controller 230 performs error correction based on FEC. When the data is restored by FEC-based error correction, ARQ serving as a data retransmission request is not sent to the sender 201. If it is determined that the error cannot be corrected, the error correction controller 230 sends ARQ serving as a retransmission request.

In FIG. 2, an RTCP packet generator 227 generates an RTCP packet serving as a retransmission request and sends the retransmission request from an RTCP packet port 225 to the sender 201. The protocol defining the retransmission request transmission is not limited to RTCP. Alternatively, a TCP-compliant retransmission request may be output via a TCP RTCP port 228.

If the error correction controller 230 determines to issue a request for retransmission, the RTCP packet generator 227 of the receiver 202 generates a retransmission-requesting NACK-RTCP packet containing data for identifying a retransmission-requested packet and outputs the NACK-RTCP packet via the RTCP packet port 225 to the sender 201. When an RTCP packet port 217 of the sender 201 receives the NACK-RTCP packet, which indicates the retransmission request from the receiver 202, the RTCP packet port 217 transfers the received NACK-RTCP packet to an RTCP packet analyzer 216. The RTCP packet analyzer 216 analyzes the packet and transfers the analysis result to an ARQ controller 213 and the network monitoring unit 215. On the basis of the input information, the network monitoring unit 215 detects the frequency of ARQ occurrence and determines the transmission state. The network monitoring unit 215 outputs the detected information to the hierarchical error correction priority controller 212. Based on the input information, the hierarchical error correction priority controller 212 dynamically changes the modes of encoding, hierarchization, prioritization, and FEC processing.

Having received the analysis result obtained by the RTCP packet analyzer 216, the ARQ controller 213 extracts, in order to retransmit a packet in response to the retransmission request, a packet specified by the NACK-RTCP packet from the buffer 207 and controls retransmission of the packet via the RTP port 210. The ARQ controller 213 functions as a retransmission controller for extracting the data packet to be retransmitted in accordance with the retransmission request message packet received from the receiver 202. When the sender 201 detects the end of stream data to be sent, the sender 201 sends an RTCP packet containing an EOS message indicating the end of a stream, which is generated by an RTCP packet generator 214 of the sender 201, to the receiver 202 and explicitly indicates the end of the data stream.

In the data communications system of the present invention, it is determined whether or not to issue a retransmission request for a lost packet in consideration of real-time playback. ARQ, which is an automatic retransmission request scheme in data transmission, is known as a very effective error correcting function. Various ARQ techniques including stop-and-wait (SAW) ARQ, go-back-N (GBN) ARQ, and selective-reject (SR) ARQ have been proposed and implemented.

In the system of the present invention, as described above, more error-resilient data transmission is implemented using a combination of FEC and ARQ. If the receiver 202 can obtain the quality of a layer by FEC and ARQ processing without dropping the layer to be processed depending on the network status, the buffer status, and the reading status, the receiver 202 performs error correction to achieve that quality and makes best efforts to prevent data quality degradation caused by dropping the data layer to be processed.

A layer selection controller 231 of the receiver 202 selects data to be processed on the basis of network status information from the network monitoring unit 229 for monitoring the network status and on the hierarchy or priority set by the sender 201. For example, when the network is in an adverse state in which packet loss and large delay occur, only the base layer or data classified as higher priority is selected and processed. When the network is in a good condition in which no packet loss or small delay occurs, higher-layer data or data classified as lower priority is additionally selected and processed. As discussed above, data is selected in accordance with the network status.

The processing of the error correction controller 230 of the receiver 202 in the data communications system shown in FIG. 2 will be described in more detail. The error correction controller 230 controls error correction in accordance with the current network status monitored by the network monitoring unit 229. The network monitoring is conducted using RTT or a packet loss rate detected by general protocols such as RTCP and Internet Control Message Protocol (ICMP). In order to ensure real-time data playback using ARQ, the RTT between the sender and the receiver must be measured at all times. In the system of the present invention, the receiver 202 actively measures the RTT between the sender 201 and the receiver 202 and updates the RTT that varies in accordance with the network status or the like. On the basis of the latest RTT, the receiver 202 determines whether or not to send NACK-RTCP serving as a retransmission request.

Since the receiver 202 detects in advance the RTT between the sender 201 and the receiver 202, the receiver 202 can detect the period from sending a retransmission request to receiving a retransmitted packet. It thus becomes possible to determine the final retransmission request time necessary for the receiver 202 to perform real-time playback. In the system of the present invention, an ARC determining unit of the receiver 202 determines the final retransmission request time based on the RTT and sends NACk-RTCP serving as a retransmission request based on the determination. Such processing will be described in detail by a description of the processing flow of each of the sender 201 and the receiver 202.

Figure 8:
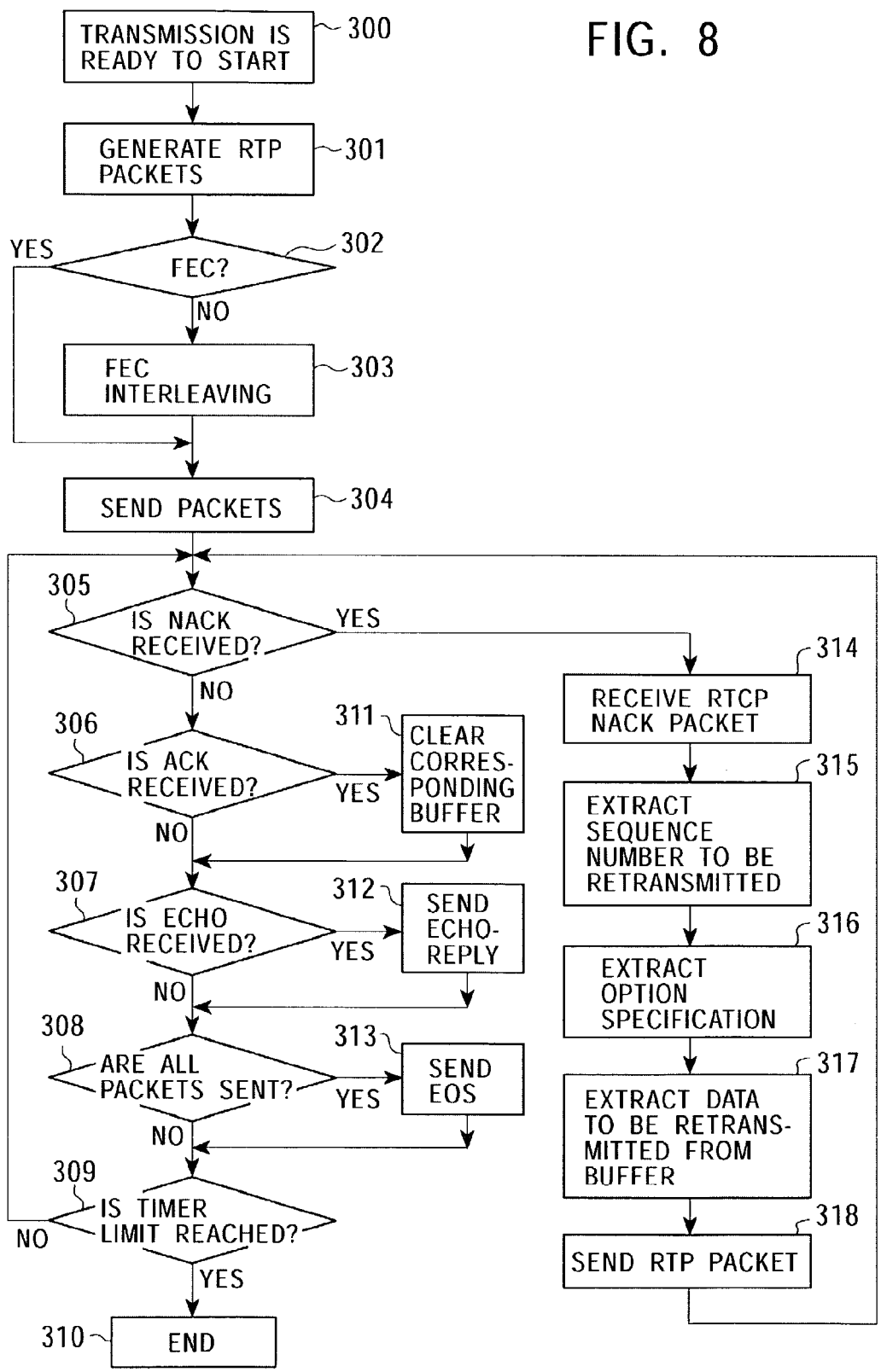
FIG. 8 is a flowchart showing a process performed by the sender in the data communications system of the present invention.

With reference to the drawings, the processing of the sender will now be described in detail. With reference to the flowchart of FIG. 8, the processing steps performed by the sender 201 are described. FIG. 8 shows a process performed by the sender 201 shown in FIG. 2. In the sender 201, the encoder 204 encodes data obtained from a video camera or a storage medium such as a DVD, CD, hard disk, etc. using the MPEG compression technique or the like and generates packets containing the encoded data in the payloads. The flow shown in FIG. 8 indicates the process from this packet generation step onward.

In S301, the sender 201 generates RTP packets containing data to be sent in the payloads. The RTP packets are arranged as described with reference to FIG. 6 and have timestamps in the headers. For example, when moving image data is sent, the same timestamp is defined in packets containing encoded data belonging to the same image frame. The timestamps are incremental as the frame progresses.

In steps S302 and S303, if necessary, the FEC processor 208 adds error-correcting redundant code to the RTP packets generated in step S301. As described above, the processing mode of the FEC processor 208 is dynamically changed. For example, the network monitoring unit 215 detects whether there is any packet delay due to the network congestion or the network bandwidth. Based on the detected information, the FEC redundancy is changed. Alternatively, the layer to which the redundant code is added is changed. For data that is not subjected to the processing of the FEC processor 208, step S303 is skipped, and the process proceeds to step S304.

The FEC processor 208 receives control information generated by the hierarchical error correction priority controller 212 on the basis of the network status information detected by the network monitoring unit 215 and decides on the control mode on the basis of the received control information. As discussed above, the FEC processor 208 adds the error-correcting redundant code not based on each piece of data but on a plurality of pieces of data in order to enhance the error resilience. In other words, the FEC processor 208 additionally performs interleaving.

In step S304, the RTP packets are sent via the RTP port 210 to the receiver 202 over the IP network 209. The IP header, which is described with reference to FIG. 7, is added to each RTP packet. Each RTP packet is distributed to an address defined in the IP header. In the packet generation and transmission, when the EOS, which explicitly indicates the end of data to be streaming-distributed, is distributed, if the time measured by a timer exceeds a preset period of time, the process is terminated.

In step S305 of FIG. 8, it is determined whether or not a NACK-RTCP packet serving as a retransmission request is received. In step S306, it is determined whether or not an ACK-RTCP packet serving as a packet reception acknowledgement response is received. In step S307, it is determined whether or not an ECHO-RTCP packet for measuring the RTT is received. The steps S305 to S307 are sequentially performed as interrupt processing in parallel with the actual data transmission using the RTP packets.

Figure 9:
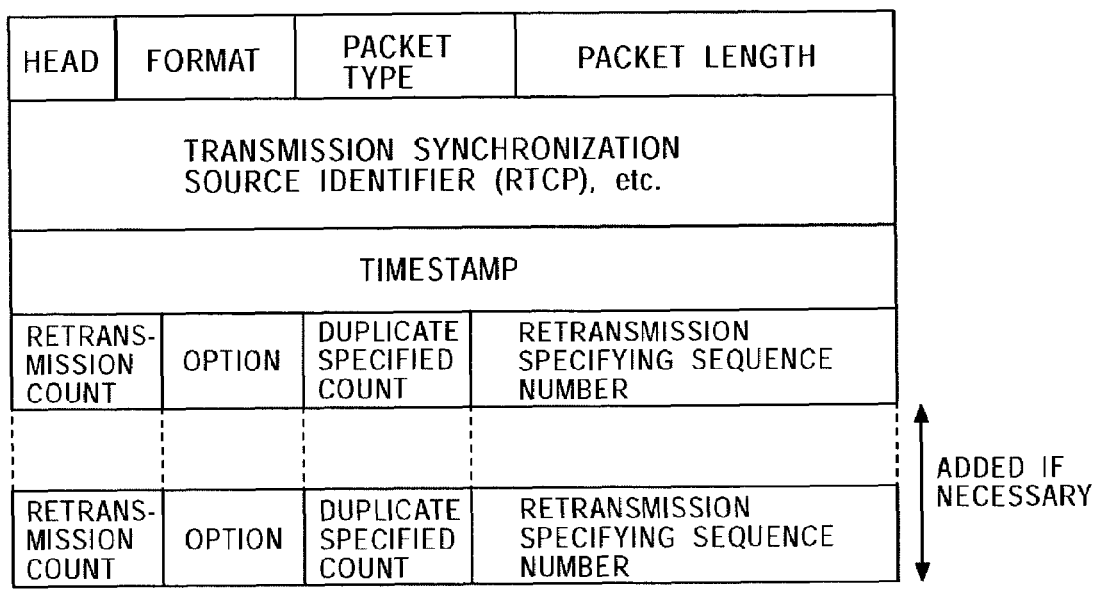
FIG. 9 is a diagram showing the format of a NACK (Negative ACKnowledge)—RTCP (Real-time Transport Control Protocol) packet transmitted in the data communications system of the present invention.

In step S305, it is determined whether or not a NACK-RTCP packet serving as a packet retransmission request from the receiver 202 is received. If the determination is affirmative, the processing in steps S314 to S318 is performed by the error correction controller 230 shown in FIG. 2. In step S314, the sender 201 receives the NACK-RTCP packet. FIG. 9 shows the structure of the NACK-RTCP packet, which is generated by the receiver 202 and which serves as the packet retransmission request received by the sender 201.

As shown in FIG. 9, the NACK-RTCP packet has the following format: the header (HEAD), format (FORMAT), packet type, packet length, transmission synchronization source identifier (RTCP), timestamp, and retransmission specifying sequence number (serving as the identifier of a retransmission-requested packet). In addition, the following data corresponding to the retransmission specifying sequence number can be included: retransmission count, option, and duplicate specified count.

As described above, the system proposed by the present invention in which ARQ is applied uses the following RTCP-compliant control packets: NACK serving as a retransmission request, ACK serving as reception acknowledgement, EOS indicating the end of data to be streaming-distributed, and ECHO and ECHO-REPLY used for measuring the RTT between the sender 201 and the receiver 202. It is not general to distinguish the RTCP packets by regarding each format type as one control message, that is, the payload type (PT) in the corresponding RTCP header. A control message is thus defined as a feedback message (FM) in the PT. At the same time, the packet format is specified in a feedback message format (FMT), which is a format field in the RTCP header. Accordingly, the type of feedback message is determined.

As shown in FIG. 9, one NACK packet can contain a sequence number(s) serving as the identifier(s) of one or more retransmission-requested packets. In other words, sending one NACK packet may request retransmission of a plurality of packets. The sequence number of each retransmission-requested packet contains the following field: the "retransmission count" field indicating the number of times the retransmission request has been sent; the "duplicate specified count" field specifying the number of times the same data is to be retransmitted when the data is to be retransmitted; and the "option" field containing other arbitrary information.

For example, when the "duplicate specified count" is set to 3, the sender 201 having received NACK consecutively sends three retransmission packets containing the same data. By sending a duplicate retransmission request for a packet storing important data, the reliability of receiving the retransmission packet is improved. When the receiver 202 fails to receive the packet although the receiver 202 has repeated NACK, i.e., a retransmission request, for the same packet multiple times, or when NACK is sent at the final retransmission time that enables the receiver 202 to implement real-time playback, the receiver 202 sets the "duplicate specified count" to a larger number and sends NACK to the sender 201. As a result, the reliability of receiving the retransmission packet is improved, and the quality of data playback is enhanced. As discussed above, the receiver 202 transmits such a NACK-RTCP packet, and the sender 201 performs packet retransmission based on the received NACK-RTCP packet.

When a packet is classified as higher priority depending on the RTP packet format or the payload format or by the intentional setting by a user of the receiver 202, a duplicate retransmission request is issued for such a packet or data of higher priority. As a result, the probability of receiving the retransmission packet is increased. By indicating the number of times the sender 201 has repeated a retransmission request in the "retransmission count" field, the sender 201 can detect NACK loss.

In the "option" field, for example, the processing modes shown in FIG. 10 can be set in accordance with field preset values, that is:

Option set value=0

Request for retransmission of a packet having a specified sequence number (default);

Option set value=1

Request for retransmission of all packets from the first packet of a frame to a packet with a specified sequence number;

Option set value=2

Request for retransmission of all packets from a specified sequence number to the last packet of a frame;

Option set value=3

Request for retransmission of all packets having a specified timestamp; and

Option set value=4

Request for retransmission of packets detected by ignoring timestamps and searching for those with a specified sequence number.

Encoded data such as image data is, as described with reference to FIG. 6, stored in an RTP packet with a header containing a set of a timestamp and a sequence number. In data transmission, when a burst error which is a series of errors in packets with different timestamps occurs or when packet loss occurs in units of frames due to a burst error, the receiver 202 may not be able to specify the set of a timestamp and a sequence number corresponding to the lost packet. In such a case, the above-described option set value is set to designate either the timestamp or the sequence number that can be specified. This makes it possible to flexibly specify a packet(s) that needs to be retransmitted.

As discussed above, the receiver 202 can specify a packet (s) that are requested to be retransmitted in various manners. Having received the NACK-RTCP packet, the ARQ controller 213 of the sender 201 extracts the specified packet(s) from among packets stored in the buffer 207 in accordance with the option set value in the option field and retransmits the packet (s).

Referring back to FIG. 8, the processing of the sender 201 will now be described. In step S315, the sender 201 extracts a sequence number corresponding to the retransmission-requested packet specified in the NACK-RTCP packet received in step S314. In step S316, the sender 201 extracts the option specification. As described above, the retransmission-requested packet(s) can be specified in various manners. For example, the packet(s) can be specified directly by a sequence number or by a timestamp. The ARQ controller 213 of the sender 201 refers to the option, timestamp, and/or sequence number specified in the received NACK-RTCP packet and specifies the retransmission-requested packet(s).

In step S317, the specified retransmission-requested packet(s) is extracted from the buffer 207. The buffer 207 stores transmitted packets for a predetermined period of time in case of a retransmission request. The packet specified to be retransmitted is extracted from among the stored packets. In step S318, the extracted packet is sent from the RTP port 217.

When the sender 201 receives no NACK-RTCP in step S305, the sender 201 determines in step S306 whether an ACK-RTCP packet serving as a packet reception response is received. Upon reception of the ACK-RTCP packet, in step S311, the sender 201 clears (deletes), from the buffer 207, the packets determined as being received. In response to the ACK-RTCP packet, the sender-side buffer 207 for storing packets in case of a retransmission request can be actively cleared in a pre-emptive manner. The possibility of buffer overflow is thus reduced.

Figure 11:
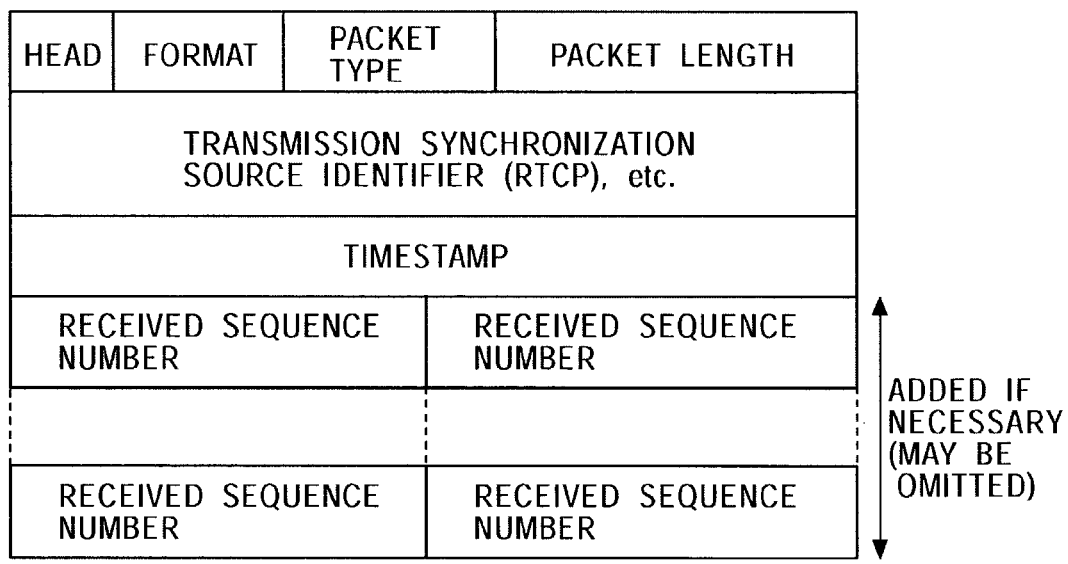
FIG. 11 is a diagram showing the format of an ACK (ACKnowledgement)—RTCP packet transmitted in the data communications system of the present invention.

FIG. 11 shows the structure of the ACK-RTCP packet, which is generated by the receiver 202 and which serves as the packet reception acknowledgement response received by the sender 201. As shown in FIG. 11, the ACK-RTCP packet has the following format: the header (HEAD), format (FORMAT), packet type, packet length, transmission synchronization source identifier (RTCP), timestamp, and received sequence number serving as the identifier of a received packet.

Instead of specifying a sequence number, only a timestamp may be specified. In this case, the ACK-RTCP packet indicates that all packets having the specified timestamp are received. It thus becomes unnecessary to specify all sequence numbers. The size of the ACK-RTCP packet is reduced, and an increase in the network traffic is suppressed.

Referring back to FIG. 8, the description of the processing of the sender 201 will be continued. In step S307, the sender 201 determines whether an ECHO-RTCP packet is received. If the ECHO-RTCP packet is received from the receiver 202, in step S312, the sender 201 sends an ECHO-REPLY-RTCP packet to the receiver 202 that has sent the ECHO-RTCP packet.

The ECHO-RTCP packet and the ECHO-REPLY-RTCP packet are RTCP packets used by the receiver 202 to measure the RTT between the sender 201 and the receiver 202. By sending and receiving the ECHO-RTCP packet and the ECHO-REPLY-RTCP packet, the receiver 202 can measure the time between sending a retransmission request to receiving a retransmitted packet. This enables the receiver 202 to detect the final retransmission request time, which is required for the receiver 202 to perform real-time playback.

In the system of the present invention, the error correction controller 230 of the receiver 202 determines the final retransmission request time based on RTT, and, on the basis of the determination, determines whether or not to send NACK-RTCP serving as a retransmission request. In order to obtain the latest information on RTT between the sender 201 and the receiver 202, which is required to make the determination, the receiver 202 actively sends an ECHO-RTCP packet to the sender 201 at an arbitrary time. Upon reception of the ECHO-RTCP packet, the sender 201 sends an ECHO-REPLY-RTCP packet to the receiver 202 that has sent the ECHO-RTCP packet.

The receiver 202 analyzes the ECHO-REPLY-RTCP packet serving as a response from the sender 201 and computes the RTT between the sender 201 and the receiver 202. The RTT computation will be described with reference to an item processed by the receiver 202 described below.

FIG. 12A shows the structure of the ECHO-RTCP packet, which is generated by the receiver 202 and which is received by the sender 201. FIG. 12B shows the structure of the ECHO-REPLY-RTCP packet, which is generated by the sender 201 and which is sent to the receiver 202. As shown in FIG. 12A, the ECHO-RTCP packet has the following format: the header (HEAD), format (FORMAT), packet type, packet length, transmission synchronization source identifier (RTCP), and ECHO-ID serving as the identification data of the ECHO packet. As shown in FIG. 12B, the ECHO-REPLY-RTCP packet has the following format: the header (HEAD), format (FORMAT), packet type, packet length, transmission synchronization source identifier (RTCP), ECHO-ID corresponding to the RCHO-RTCP packet, and server processing time.

Since the ECHO-RTCP packet and the ECHO-REPLAY-RTCP packet contain ECHO-ID, upon reception of the ECHO-REPLY-RTCP packet, the receiver 202 can determine the time at which the ECHO-RTCP packet associated with the received ECHO-REPLY-RTCP packet is sent. The server processing time contained in the ECHO-REPLY-RTCP packet corresponds to a period from receiving, by the sender 201, a retransmission request (NACK-RTCP) from the receiver 202 to outputting a packet from the sender 201. The server processing time can be set to a period from receiving the ECHO-RTCP packet to sending the ECHO-REPLY-RTCP packet. Alternatively, an actual period between receiving, by the sender 201, a retransmission request (NACK-RTCP) from the receiver 202 and outputting a packet from the sender 201 is stored in advance as past log data in a memory, and the stored data is applied as the server processing time. Alternatively, the processing load at a server (sender 201) upon reception of the ECHO-RTCP packet is computed, and the estimated processing time computed based on the processing load is set as the server processing time.

The receiver 202 computes the RTT between the sender 201 and the receiver 202 on the basis of the server processing time, which is stored in the ECHO-REPLY-RTCP packet, and a period from the sending of the ECHO-RTCP packet to the reception of the ECHO-REPLY-RTCP packet. The RTT computation will be described with reference to an item processed by the receiver 202 described below.

Referring back to FIG. 8, the description of the processing of the sender 201 will be continued. In step S308, the sender 201 determines whether or not all packets of streaming data to be transmitted have been sent. If the determination is affirmative, in step S313, the sender 201 sends an RTCP packet containing an EOS message indicating the end of the data stream to the receiver 202.

FIG. 13 shows the structure of the EOS-RTCP packet, which is generated by the sender 201 and which is received by the receiver 202. As shown in FIG. 13, the EOS-RTCP packet has the following format: the header (HEAD), format (FORMAT), packet type, packet length, transmission synchronization source identifier (RTCP), and timestamp (TIMESTAMP). The receiver 202 receives the EOS-RTCP packet from the sender 201 and recognizes the end of data to be streaming-distributed. By recognizing the end of data, the receiver 202 is prevented from sending NACK when the subsequent frame does not arrive thereat.

Referring back to FIG. 8, the description of the processing of the sender 201 will be continued. In step S309, the sender 201 determines whether or not the time measured by the timer exceeds the preset time. If the time measured by the timer does not exceed the preset time, the processing from step S305 onward, namely, the processing from step S305 onward in which it is determined whether a NACK-RTCP packet serving as a packet retransmission request is received, is continuously performed. Even after all the packets have been sent, the sender 201 may receive a NACK-RTCP packet serving as a packet retransmission request, an ACK-RTCP packet serving as a reception acknowledgement response, or an ECHO-RTCP packet from the receiver 202. Thus, the sender 201 continuously performs the processing in case of reception of such a packet(s). The data transmission is terminated at the time the preset time has elapsed.

Figure 14:
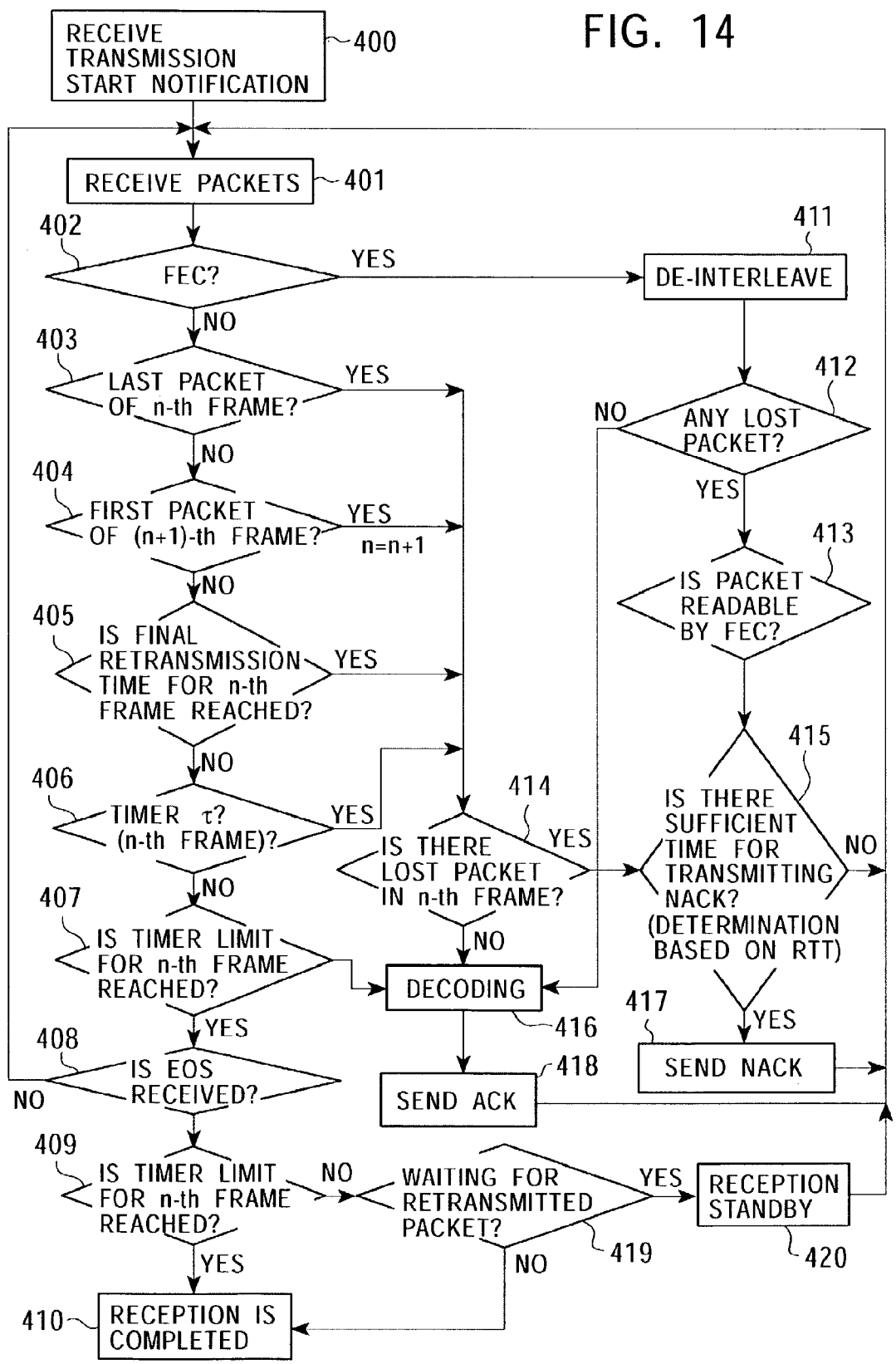
FIG. 14 is a flowchart showing a process performed by the receiver in the data communications system of the present invention.

With reference to the flowchart of FIG. 14, the processing steps performed by the receiver 202 will now be described. FIG. 14 shows the flow of a process performed by the receiver 202 shown in FIG. 2. In step S400, the receiver 202 receives a transmission start notification from the sender 201. In step S401, the receiver 202 sequentially receives packets sent from the sender 201, that is, RTP packets containing encoded data in the payloads. As described with reference to FIG. 6, a timestamp is defined in the header of each of the RTP packets. The receiver 202 determines a frame(s) to which the received packets belong on the basis of the timestamps. As discussed above, when encoded moving image data is contained in RTP packets and the RTP packets are sent, the same timestamp is defined in a plurality of RTP packets belonging to the same image frame. The receiver 202 refers to the timestamps and determines the frame(s).

In step S402, the receiver 202 determines whether or not the received packets contain error-correcting redundant code. If the packets contain redundant code, in step S411, the error correction controller 230 performs de-interleaving corresponding to interleaving performed by the sender 201. In step S412, it is determined whether or not there is any packet loss. If there is no packet loss, the process proceeds to step S416 in which decoding is performed. If there is packet loss, in step S413, the error correction controller 230 performs FEC-based error correction, that is, error correction based on redundant code and determines whether or not the data can be read by performing error correction. If it is determined that the data can be read/played, the process proceeds to step S416 in which decoding is performed.

If it is determined in step S413 that the data cannot be read by FEC, the process proceeds to step S415. In step S415, it is determined whether or not to send a NACK-RTCP packet serving as a retransmission request. This determination will now be described. In order to achieve real-time playback, a retransmission-requested packet needs to arrive at the receiver 202 on time for playback. The determination of whether to send a NACK-RTCP packet serving as a retransmission request in step S415 is conducted to determine whether a retransmitted packet can be received on time for real-time playback.

As described above, the RTT between the sender 201 and the receiver 202 is an important parameter in the determination. If the RTT is large, even when the receiver 202 sends a retransmission request to the sender 201, if it takes time for the sender 201 to retransmit a packet and for the receiver 202 to receive the retransmitted packet, the retransmitted packet may not be on time for real-time playback since the packet subsequently needs to be decoded by the decoder 224. In the system of the present invention, the receiver 202 detects in advance the RTT and determines, on the basis of the RTT, whether or not to send a NACK-RTCP packet. In the system of the present invention, the receiver 202 can measure the RTT at an arbitrary time. Specifically, the receiver 202 sends the above-described ECHO-RTCP packet, which is shown in FIG. 12, receives the ECHO-REPLY-RTCP packet, and computes the RTT.

Figure 15A:
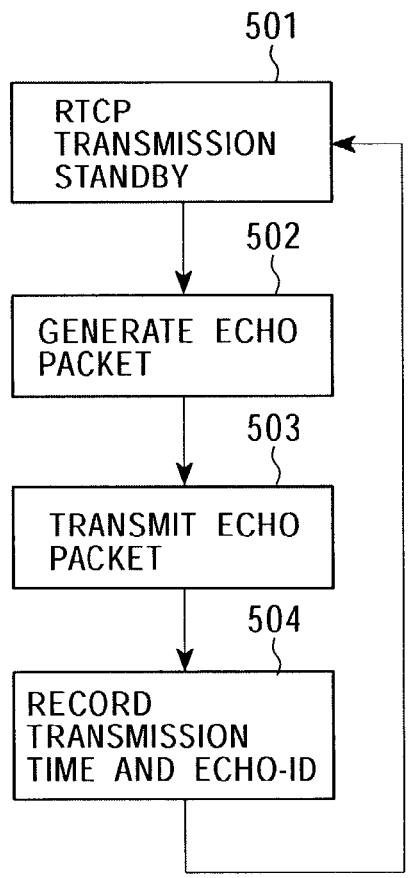
FIGS. 15A and 15B are flowcharts showing a process of measuring round trip time (RTT) using the ECHO-RTCP and ECHO-REPLY-RTCP packets by the receiver in the data communications system of the present invention.
Figure 15B:
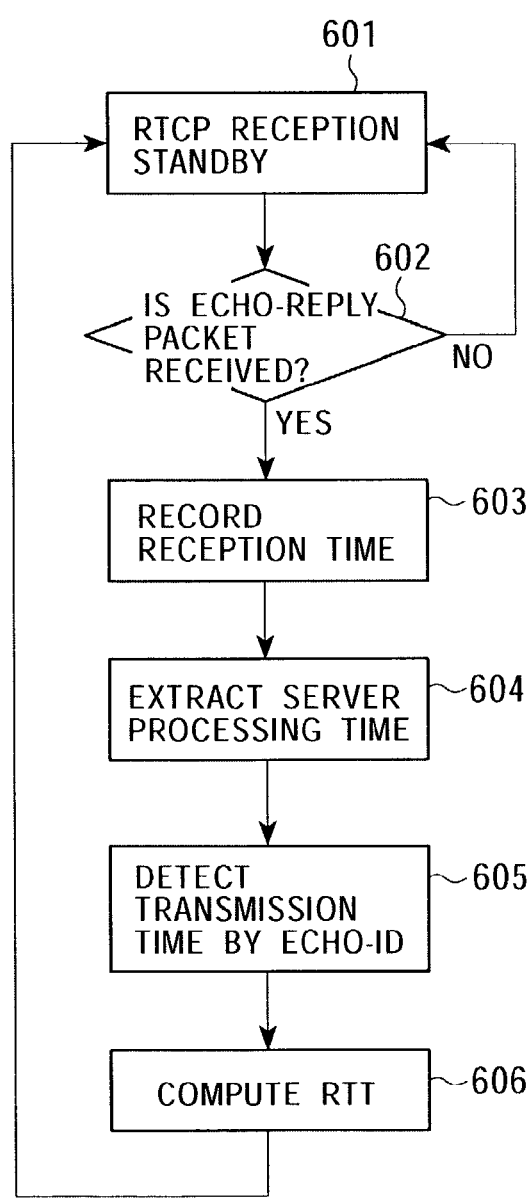

Referring to FIGS. 15A and 15B, sending of the ECHO-RTCP packet, reception of the ECHO-REPLY-RTCP packet, and computation of the RTT, all of which are performed by the receiver 202, will now be described. FIG. 15A is a flowchart showing a process of sending the ECHO-RTCP packet. The ECHO-RTCP packet can be actively sent at an arbitrary time by the receiver 202.

In step S501 in which the receiver 202 is in an RTCP-packet transmission standby mode, when an RTT measuring request is issued, the process proceeds to step S502 in which an ECHO-RTCP packet is generated. The RTT can be set to be periodically measured after data reception begins, such as after receiving the transmission start notification in step S400 of the flowchart of FIG. 14. A timer contained in the receiver 202 measures time, and it is determined whether the measured time has reached a preset time period. If the time corresponding to the preset time period has elapsed, the error correction controller 230 outputs an ECHO-RTCP packet generation request to the RTCP packet generator 227. In step S502, the RTCP packet generator 227 generates an ECHO-RTCP packet. Alternatively, the packet loss status is analyzed, and an ECHO-RTCP packet is generated and transmitted in accordance with the packet loss status. At any rate, the receiver 202 can generate and transmit the ECHO-RTCP packet at an arbitrary time and compute the latest RTT at any time.

The ECHO-RTCP packet generated in step S502 has the structure shown in FIG. 12A. The packet contains the ECHO-ID serving as the packet's unique identifier. In step S503, the generated ECHO-RTCP packet is transmitted via the RTCP packet port 225 to the sender 201. In step S504, the time at which the ECHO-RTCP packet is transmitted and the ECHO-ID defined in the packet are recorded in a memory.

FIG. 15B is a flowchart showing a process of receiving the ECHO-REPLY-RTCP packet and computing the RTT. In step S601 in which the receiver 202 is in an RTCP-packet reception standby mode, when it is determined that an ECHO-REPLY-RTCP packet is received (affirmative in step S602), in step S603, the time at which the ECHO-REPLY-RTCP packet is received is recorded in the memory. The received ECHO-REPLY-RTCP packet has the structure shown in FIG. 12B. The packet contains the ECHO-ID serving as the same identifier as that of the corresponding ECHO-RTCP packet that has been responded. Also, the server processing time computed by the sender 201 is stored.

In step S604, the server processing time is extracted from the received ECHO-REPLY-RTCP packet. In step S605, the time at which the corresponding ECHO-RTCP packet is transmitted is detected using the ECHO-ID defined in the received ECHO-REPLY-RTCP packet. In step S606, the RTT is computed on the basis of the time at which the ECHO-REPLY-RTCP packet is received (obtained in step S603), the server processing time (obtained in step S604), and the time at which the ECHO-RTCP packet is transmitted (obtained in step S605). The RTT can be computed using the following equation:

RTT=(ECHO-REPLY received time)−(ECHO transmitted time)−(server processing time)

When the RTT is measured, the transmitted/received ECHO and ECHO-REPLY packets may be lost. Also, the RTT is variable at all times in accordance with the network status. Therefore, the receiver 202 transmits/receives the ECHO and ECHO-REPLY packets at predetermined intervals and measures the RTT.

Referring back to FIG. 14, the description of the processing of the sender 202 will be continued. When the NACK-RTCP serving as the retransmission request is output, it is determined in step S415 whether or not a retransmission-requested packet can be received on time to perform real-time playback. When it is determined that transmission of the NACK-RTCP packet serving as the retransmission request is not on time based on the RTT measured on the basis of transmission/reception of the above-described ECHO and ECHO-REPLY packets and based on the limit of the timer for measuring the processing time of each frame, that is, when the determination in step S415 is negative, the NACK-RTCP packet is not sent.

For example, when the time until the processing of encoded data in the corresponding frame having a lost packet starts Ta is 100 msec, that is, when it is clear from the time measured by the timer that the data will be transferred to the decoder 224 to be decoded after 100 msec, if the latest measured RTT is greater than Ta (time until the processing of the encoded data in the corresponding frame starts), namely, 100 msec, it is determined that reception of a retransmitted packet will not be on time despite transmission of the NACK-RTCP packet. Thus, the NACK-RTCP packet is not transmitted. When the RTT is greater but very close to Ta (time until the processing starts), the transmitted packet may be received on time for real-time playback, at the last minute. In this case, the NACK-RTCP packet may be transmitted. A threshold for determining whether to transmit the NACK-RTCP packet is implementation-dependent.

In contrast, when the latest measured RTT is less than or equal to Ta (time until the processing of the encoded data in the corresponding frame having a lost packet starts), it means that the time from sending the NACK-RTCP packet serving as the retransmission packet to receiving the retransmitted packet is less than or equal to the time until the decoding starts. It is thus determined that the retransmitted packet can be received on time. In step S417, the NACK-RTCP packet is transmitted.

In step S402 of the flowchart of FIG. 14, if it is determined that the packet contains no redundant code based on the FEC, in step S403, it is determined whether or not the received packet is the last packet of n-th frame (n=1, 2, . . . ). In step S404, it is determined whether or not the received packet is the first packet of (n+1)-th frame. If the received packet is the last packet of n-th frame (n=1, 2, . . . ) or the first packet of the (n+1)-th packet, the process proceeds to step S414.

In step S414, it is determined whether or not n-th packet contains a packet that has not been received, that is, a lost packet or error packet. When a lost packet or error packet is detected, the process proceeds to step S415. It is determined whether to transmit the NACK-RTCP packet serving as the retransmission request, and, on the basis of the determination, the NACK-RTCP packet is transmitted. Details of the determination are described above.

If a set of the timestamp and the sequence number is unclear at the time the NACK-RTCP packet is transmitted, the option is specified, as described with reference to FIG. 10, and the NACK-RTCP packet is transmitted. Since the receiver 202 occasionally records packet transmission/reception information, the packet loss rate can be detected. When the loss rate is greater than or equal to a predetermined value, the NACK-RTCP packet itself may be lost. Therefore, the same NACK-RTCP packet is transmitted multiple times. As a result, the retransmission success rate is increased. Alternatively, an increased "duplicate specified count" is defined in the NACK-RTCP packet. When the sender 201 receives the NACK-RTCP packet, the sender 201 sends a retransmission packet in conjunction with frame data having the next timestamp.

The lost-packet detection in step S414 is performed when it is determined in step S404 that the packet is the first packet of each frame, when the determination in step S405 is affirmative (when it is determined that the final retransmission time for each frame has reached), or when the determination in step S406 is affirmative (when it is determined that the minimum measured time τ of the timer has reached). For each frame, the final retransmission time determination is made in step S405 to determine, when the NACK-RTCP packet serving as the retransmission request is output, whether the final retransmission time, at which the retransmitted packet is on time for real-time playback, has reached. For each frame, when Ta (time until the processing of the encoded data in each frame starts) is equal to the measured RTT, that is, when Ta=RTT, the determination in step S405 is affirmative. In step S414, it is determined whether or not the corresponding frame has a lost packet. At the final-retransmission-request allowed time, the frame is checked for a lost packet. If a lost packet is detected, the final retransmission request is transmitted.

In step S406, it is determined whether or not the timer's minimum measured time τ has elapsed. When the determination is affirmative every τ (minimum measured time of the timer contained in the receiver 202), in step S414, the corresponding frame is checked for a lost packet. Even when the first packet or the last packet is not detected, the received frame corresponding to τ (minimum measured time) is reliably checked for a lost packet. Accordingly, retransmission is reliably requested.

As discussed above, the receiver 202 checks for a lost packet in step S414 when the last packet of each frame is received in step S403, when the first packet of each frame is received in step S405, when it is determined in step S405 that the final retransmission time for each frame has reached, or when it is determined in step S406 that the timer's minimum measured time τ has elapsed. Alternatively, the receiver 202 can check for a lost packet when the determination is affirmative in any one of the four steps S403 to S406.

When no lost packet is detected in each frame in step S414, the decoder 224 decodes the encoded data stored in each packet. In step S418, an ACK-RTCP packet serving as a reception acknowledgement packet corresponding to the received packets is generated and transmitted. As described with reference to FIG. 11, the ACK-RTCP packet is a packet containing the received sequence number. Having received the ACK-RTCP packet, the sender 201 clears a packet corresponding to the received sequence number recorded in the ACK-RTCP packet from the buffer 223.

In step S407 of the flowchart shown in FIG. 14, the process confirms the timer limit for each frame. The timer limit is set by the timer for measuring the start limit for real-time playback. The timer limit is set for each frame. When it is determined that the timer limit for n-th frame is reached, the process proceeds to decoding in step S416 even if there is a lost packet. In step S408, it is determined whether or not an RTCP packet containing an EOS message indicating the end of data stream is received from the sender 201. If no EOS-RTCP packet is received, the processing from step S401 onward is repeated.

When the EOS-RTCP packet is received, in step S409, the process confirms the timer limit for each frame. The timer limit is set by the timer for measuring the start limit for real-time playback. The timer limit is set for each frame. If the timer limit has not been reached, in step S419, it is determined whether or not the process is in a standby mode for receiving a retransmitted packet related to the retransmission-requested lost packet. If the process is in the standby mode, the process proceeds to step S420 in which the process is in the reception standby mode for receiving a retransmitted packet. The processing from step S401 onward is repeated.

When the determination in step S409 is affirmative (that is, when it is determined that the timer limit for each frame is reached), or when it is determined in step S419 that the process is not in the retransmitted-packet reception standby mode, it is determined that there is no packet data (necessary for playback) that has not been received. In step S410, the reception is completed.

In the system of the present invention, FEC-based error correction and ARQ serving as retransmission request processing are selectively performed in packet transmission in accordance with a data communications protocol such as RTP which is suitable for real-time distribution though reliability is not ensured. As a result, more error-resilient and highly reliable data transmission and real-time playback are performed. In the above-described embodiment, the encoded data is stored in the RTP packets. Alternatively, data communications using packets based not only on the RTP packet format but also on other data communications protocol formats, such as the User Datagram Protocol (UDP), can achieve features similar to those of the above-described embodiment by performing retransmission request processing using various control packets similar to those in the above-described embodiment.

As discussed above, according to the configuration of the present invention, each frame is checked for a lost packet at various times, such as when the first packet of each frame is received, when the last packet of each frame is received, at the final processing limit, or at predetermined intervals (τ). Accordingly, a lost packet is reliably detected.

The hierarchical error correction priority controller 212 of the sender 201 and the error correction controller 230 of the receiver 202 in the data communications system of the present invention control error correction in accordance with the current network status monitored by the network monitoring units 215 and 219 of the sender 201 and the receiver 202. The network is monitored on the basis of the RTT or packet loss rate detected using a general protocol such as RTCP or ICMP. In order to enable the receiver 202 to detect the RTT, the receiver 202 sends the above-described ECHO packet to the sender 201 and receives the ECHO-REPLY packet in response to the ECHO packet. Accordingly, the receiver 202 measures the RTT and reliably transmits a packet retransmission request.

As described above, the RTP assigns a sequence number to each packet. By placing the sequence number and flags indicating the start and the end of a particular frame in the payload, the receiver 202 easily computes the number of packets forming the frame. By monitoring the number of valid packets that have arrived within a particular period of time relative to the number of necessary packets, the error rate is detected to a certain degree. In accordance with the detected error rate or a packet loss rate in a Receiver Report (RR) of the RTCP defined by RFC 1889, the sender 201 detects the error rate and increases the FEC error correction intensity. Alternatively, the sender 201 determines not to apply FEC.

ARQ, which is a packet retransmission request serving as error correction, requires the RTT between sending the retransmission request NACK and receiving the retransmitted packet. Also, FEC requires a predetermined period of time since the sender 201 and the receiver 202 perform interleaving and de-interleaving. On the basis of the network status monitored by the network monitoring units 215 and 229 of the sender 201 and the receiver 202, for example, when the RTT is short, ARQ-based retransmission is feasible. Thus, ARQ-based error correction is selected and performed. In contrast, when the RTT is long and the network status is such that it takes much time to send data from the sender 201 to the receiver 202 in which there is not sufficient time for retransmission, error correction based not on ARQ but on FEC is selected. In this manner, dynamic error correction control is performed.

On the basis of the sequence number assigned by RTP to each packet, the error monitoring unit 222 of the receiver 202 computes the error rate indicating the number of valid packets that have arrived within a particular period of time relative to the number of necessary packets. By counting the number of retransmission requests, the sender 201 computes an approximate error rate. When it is determined that the error rate is so high that the errors cannot be corrected by FEC-based error correction, the hierarchical error correction priority controller 212 of the sender 201 causes the FEC processor 208 to stop adding redundant code and selects to only respond to a retransmission request (ARQ) from the receiver 202. Alternatively, the hierarchical error correction priority controller 212 of the sender 201 selects FEC that uses an algorithm of higher error correction intensity. In this manner, the error control mode can be dynamically changed.

The error control mode can be selectively set in accordance with the priority depending on the hierarchy of data to be transmitted. Various error correction policies are determined. For example, the network monitoring unit 229 of the receiver 202 analyzes the network status on the basis of a packet loss rate or transmission delay time. The layer selection controller 231 selects data to be processed on the basis of the analysis result.

Since the error correction policies can be changed in response to the network status or intentions of the sender 201 and the receiver 202, the error correction policies need not to be unique. In a particular transmission environment and medium, the complete playback of the base layer is preferred. The priority level for the base layer is thus enhanced by applying FEC and ARQ of higher intensity. For audio data, only FEC is applied. Alternatively, FEC is not applied since overhead needs to be minimized, and ARQ-based retransmission is performed only once. In this manner, the error control mode is freely set.

In the system of the present invention, the receiver 202 performs data retransmission request processing in consideration of the playback processing time and the propagation delay time, i.e., RTT. Unnecessary retransmission request packets and retransmitted packets are thus prevented from being sent. This allows the network bandwidth not to be narrowed by retransmission. When the receiver 202 occasionally records packet transmission/reception information and detects the packet loss rate, if the loss rate is greater than or equal to a predetermined value, the same NACK-RTCP packet is sent multiple times. As a result, the retransmission success rate is increased.

The above-described series of processes can be performed by hardware, software, or a combination of both. When the series of processes is performed by software, a program having recorded therein a processing sequence is installed into a memory in a data processor contained in dedicated hardware or into a general computer for performing various processes, and the program is executed. When the series of processes is performed by software, a program forming the software is installed into, for example, a general computer or a microcomputer.

Figure 16:
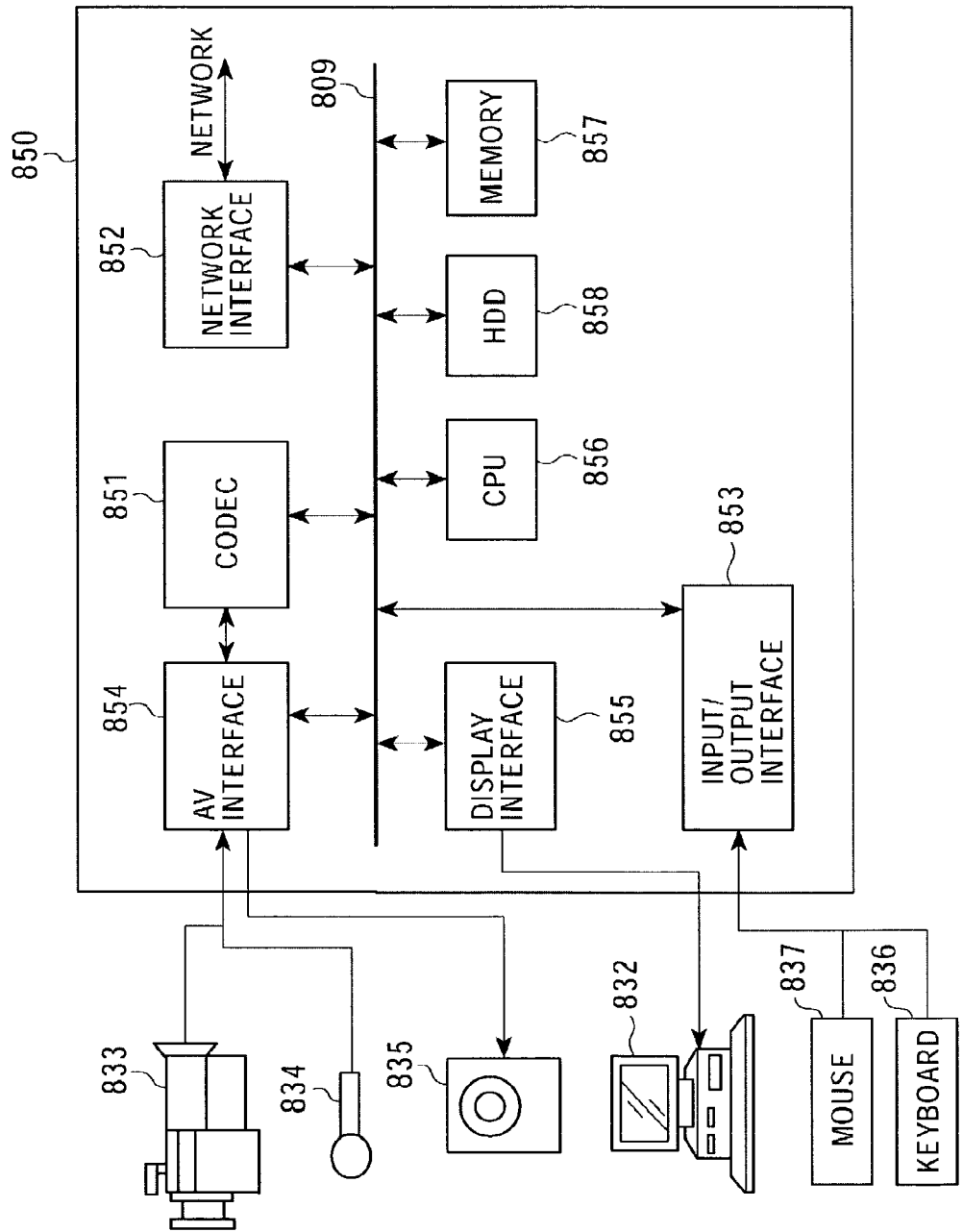
FIG. 16 is a diagram showing an example of the configuration of the system including the sender and the receiver.

FIG. 16 shows an example of the configuration of a system including a sender and a receiver for performing the series of processes described in the above embodiment. Data sent and received in the system of the present invention is encoded data. The sender performs encoding, and the receiver performs decoding. The encoded data is divided into packets and the packets are sent and received via a network. The sender performs packet generation (packetizing), and the receiver performs packet expansion (depacketizing).

A sender/receiver 850, such as a personal computer, shown in FIG. 16, includes a codec 851 for performing encoding, decoding, packet generation, and packet expansion; a network interface 852 functioning as an interface with a communications network; an input/output interface 853 with input devices such as a mouse 837 and a keyboard 836; an AV interface 854 for receiving data from and outputting data to AV data input/output devices such as a video camera 833, a microphone 834, and a speaker 835; a display interface 855 serving as a data output interface with a display 832; a CPU 856 for controlling data transmission among the data input/output interfaces, the codec 851, and the network interface 852 and performing other various programs; a memory 857 including a RAM and a ROM functioning as a storage area for storing various programs executed by the CPU 856 and data and as a work area for the CPU 856; and a hard disk drive (HDD) 858 serving as a storage medium for storing data and programs. The components are connected to a peripheral component interconnect (PCI) bus 859 and can exchange data with one another.

The codec 851 receives, as shown in FIG. 16, for example, image data from the video camera 833 and audio data from the microphone 834, encodes and packetizes the data, and generates packets containing the encoded data in the payloads. The generated packets are output through the PCI bus 859 via the network interface 852 to the network and distributed to a destination address defined in the headers of the packets. Alternatively, under the control of the CPU 856, the image data from the video camera 833 and the audio data from the microphone 834 are encoded in accordance with a software encoding program stored in the HDD 858 or the memory 857, and the encoded data is output via the network interface 852 to the network.

In contrast, the IP-packetized data received via the network is output via the network interface 852 through the PCI bus 856 to the codec 851. The codec 851 depacketizes the received data, extracts and decodes the encoded data stored in the payloads, and outputs the decoded data to the display 832 and the speaker 835 to be displayed and played.

Data such as an image to be processed in the above-described embodiment can be input from an input device such as a camera, a data input device such as a scanner, or a removable recording medium such as an FD, a CD-ROM (Compact Disc Read Only Memory), an MO disc, a DVD, a magnetic disk, or a semiconductor memory. The CPU 856 can load not only a ROM-stored program but also a program stored in the hard disk, a program transmitted from a satellite or a network, received, and installed in the hard disk into a memory such as a RAM and execute the program.

In the specification, a program may be processed by a single computer or by a plurality of computers in a distributed processing manner. Alternatively, a program may be transferred to a remote computer and executed by the remote computer.

As described above, according to the configuration of the present invention, error correction control can be performed in consideration of the current network status monitored by a network monitoring unit. The error control mode is dynamically changed between, for example, an FEC-based error control mode and an ARQ-based error control mode (retransmission request processing) in accordance with a packet loss or error rate of the network. A packet error rate or a packet loss rate in the RR of the RTCP defined by RFC 1889 is obtained, and the obtained data serves as monitoring data. The sender may increase the FEC error correction intensity or may determine not to apply FEC and only apply ARQ. The processing mode can be changed in this manner.

According to the configuration of the present invention, on the basis of the network status determined by monitoring the network by the network monitoring unit, for example, if the RTT is short, ARQ-based retransmission is feasible. ARQ-based error correction is thus selected and performed. If the RTT is long and the network status is such that it takes time for the sender to send data to the receiver in which there is not sufficient time for retransmission, error correction based not on ARQ but on FEC is selected. In this manner, dynamic error correction control is performed.

The error control mode is selectively set in accordance with the priority depending on the hierarchy of data to be transmitted. Different types of error correction can be performed in accordance with the hierarchical levels of encoded data. For example, the base layer is classified as higher priority using FEC and ARQ of higher intensity. For audio data, only FEC is applied. Alternatively, FEC is not applied since overhead needs to be minimized, and ARQ-based retransmission is performed only once. In other words, the number of retransmissions can be restricted. As discussed above, the error control mode can be freely set.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A data communications system for performing streaming data transmission, comprising:
   a data sender; and
   a data receiver, wherein the data sender includes,
   a packet sending processor for sending data packets containing data to be sent;
   a network status monitoring unit for monitoring the network status of a network between the data sender and the data receiver;
   a hierarchization unit for organizing encoded data to be sent into hierarchical layers;
   a data-sender-side controller for controlling an error control mode for the transmitted packets and a bit-rate by controlling the encoding mode of the hierarchization unit, based on the network status monitored by the network status monitoring unit and priority levels associated with the hierarchical layers generated by the hierarchization unit;
   a retransmission controller for extracting a data packet to be transmitted in accordance with a retransmission request message packet received from the data receiver;
   a prioritization processor for specifying priority levels for the hierarchical layers generated by the hierarchization unit based on an effect of loss during hierarchical encoding and a packet loss rate during transmitting, where a first hierarchical layer priority is set in an internet protocol (IP) header, and a second hierarchical layer priority is set in a realtime transport protocol (RTP) header;
   a forward error correction (FEC) processor for adding error-correcting redundant code to the encoded data, the encoded data outputted to an RTP packet generator; and
   wherein the data receiver includes,
   a packet reception processor for receiving the data packets from the data sender;
   a data-receiver-side network status monitoring unit for monitoring the network status;
   an error correction controller for detecting an error or packet loss in the data packets received from the data sender and performing error-compliant processing;
   a retransmission request controller for determining, on the basis of the detection of the error or packet loss in the data packets received from the data sender, whether to send the retransmission request message packet serving as a data packet retransmission request to the data sender; and
   a layer selection controller for selecting, in accordance with the hierarchy or priority, data to be processed on the basis of an analysis result by the data-receiver-side network status monitoring unit.

2. A data communications system according to claim 1, wherein the data sender-side controller changes, on the basis of the network status monitored by the network status monitoring unit, the processing mode of forward error correction (FEC) serving as error control or the processing mode of automatic repeat request (ARQ) serving as data retransmission request processing.

3. A data communications system according to claim 1, wherein the network status monitoring unit analyzes the network status on the basis of a packet loss rate, transmission delay time, or the retransmission request from the data receiver and outputs an analysis result to the data-sender-side controller, and the data-sender-side controller controls the error control mode for the transmitted packets on the basis of the analysis result.

4. A data communications system according to claim 1, wherein the data receiver further comprises a data-receiver-side network status monitoring unit for monitoring the network status, and the data-receiver-side network status monitoring unit analyzes the network status on the basis of a packet loss rate or transmission delay time and selects data to be processed on the basis of the analysis result.

5. A data communications system according to claim 1, wherein the error correction controller of the data receiver performs error correction based on forward error correction (FEC) serving as error control or automatic repeat request (ARQ) serving as data retransmission request processing.

6. A data communications system according to claim 1, wherein the error correction controller of the data receiver controls sending of an ECHO packet to the data sender and reception of an ECHO-REPLY packet in response to the ECHO packet in order to compute a round trip time (RTT) between the data sender and the data receiver, and on the basis of the RTT computed based on the ECHO packet and the ECHO-REPLY packet, it is determined whether reception of a retransmitted data packet in response to the retransmission request is feasible prior to the start of reading data stored in the retransmitted data packet.

7. A data communications system according to claim 1, wherein the data sender further comprises:
   a hierarchization unit for organizing encoded data to be sent into hierarchical layers; and
   a prioritization processor for specifying priority levels for the hierarchical layers generated by the hierarchization unit, and
   the data-sender-side controller changes the hierarchization mode of the hierarchization unit or the processing mode of the prioritization processor in accordance with the network status.

8. A data communications system according to claim 1, wherein the data sender further comprises a hierarchization unit for organizing encoded data to be sent into hierarchical layers, and the data-sender-side controller changes, on the basis of the network status monitored by the network status monitoring unit, the processing mode of forward error correction (FEC) serving as error control or the processing mode of automatic repeat request (ARQ) serving as data retransmission request processing in accordance with each of the hierarchical layers generated by the hierarchization unit.

9. A data communications system according to claim 1, wherein the data sender further comprises:
   a hierarchization unit for organizing encoded data to be sent into hierarchical layers; and
   a prioritization processor for specifying priority levels for the hierarchical layers generated by the hierarchization unit, and the data-sender-side controller changes, on the basis of the network status monitored by the network status monitoring unit, the processing mode of forward error correction (FEC) serving as error control or the processing mode of automatic repeat request (ARQ) serving as data retransmission request processing in accordance with each of the priority levels specified by the prioritization processor.

10. A data communications system according to claim 1, wherein the first hierarchical layer has a different number of priority levels from the second hierarchical layer.

11. A data communications system according to claim 1, wherein the FEC processor interleaving for enhancing error resilience.

12. A data communications system according to claim 1, wherein the data-sender-side controller outputs control information to each of the hierarchization unit and the prioritization processor.

13. A data sender for sending streaming data, comprising:
a packet sending processor for sending data packets containing data to be sent;
a network status monitoring unit for monitoring the network status of a network between the date sender and a data receiver;
a data-sender-side controller for controlling an error control mode for the transmitted packets, based on the network status monitored by the network status monitoring unit;
a retransmission controller for extracting a data packet to be retransmitted in accordance with a retransmission request message packet received from the data receiver;
a hierarchization unit for organizing encoded data to be sent into hierarchical layers;
a prioritization processor for specifying priority levels for the hierarchical layers generated by the hierarchization unit, where a first hierarchical layer priority is set in an internet protocol (IP) header, and a second hierarchical layer priority is set in a realtime transport protocol (RTP) header; and
a forward error correction (FEC) processor for adding error-correcting redundant code to the encoded data, the encoded data outputted to an RTP packet generator.

14. A data sender according to claim 13, wherein the data-sender-side controller changes, on the basis of the network status monitored by the network status monitoring unit, the processing mode of forward error correction (FEC) serving as error control or the processing mode of automatic repeat request (ARQ) serving as data retransmission request processing.

15. A data sender according to claim 13, wherein the network status monitoring unit analyzes the network status on the basis of a packet loss rate, transmission delay time, or the retransmission request from the data receiver and outputs an analysis result to the data-sender-side controller, and the data-sender-side controller controls the error control mode for the transmitted packets on the basis of the analysis result.

16. A data sender according to claim 13:
wherein the data-sender-side controller changes the hierarchization mode of the hierarchization unit or the processing mode of the prioritization processor in accordance with the network status.

17. A data sender according to claim 13, further comprising a hierarchization unit for organizing encoded data to be sent into hierarchical layers, wherein the data-sender-side controller changes, on the basis of the network status monitored by the network status monitoring unit, the processing mode of forward error correction (FEC) serving as error control or the processing mode of automatic repeat request (ARQ) serving as data retransmission request processing in accordance with each of the hierarchical layers generated by the hierarchization unit.

18. A data sender according to claim 13, further comprising:
a hierarchization unit for organizing encoded data to be sent into hierarchical layers; and a prioritization processor for specifying priority levels for the hierarchical layers generated by the hierarchization unit, wherein the data-sender-side controller changes, on the basis of the network status monitored by the network status monitoring unit, the processing mode of forward error correction (FEC) serving as error control or the processing mode of automatic repeat request (ARQ) serving as data retransmission request processing in accordance with each of the priority levels specified by the prioritization processor.

19. A data sender according to claim 13, wherein the first hierarchical layer has a different number of priority levels from the second hierarchical layer.

20. A data sender according to claim 13, wherein the FEC processor performs interleaving for enhancing error resilience.

21. A data sender according to claim 13, wherein the data-sender-side controller outputs control information to each of the hierarchization unit and the prioritization processor.

22. A data communications method for performing streaming data transmission between a data sender and a data receiver, comprising:
providing a forward error correction (FEC) processor for adding error-correcting redundant code to data to be sent;
outputting the data to be sent to an RTP packet generator;
a packet sending step of sending data packets containing the data to be sent;
a network status monitoring step of monitoring the network status;
a hierarchization step of organizing encoded data to be sent into hierarchical layers, wherein an information item is represented by each of the lagers, each of the layers of data representing the information item at different levels of data compression;
a data-sender-side controlling step of dynamically changing controlling an error control mode for processing data packets to be transmitted the transmitted packets and a bit-rate by controlling the encoding mode during the hierarchization step, based on the network status monitored in the network status monitoring step and priority levels associated with the hierarchical layers generated by the hierarchization step; and
a retransmission controlling step of extracting a data packet to be retransmitted in accordance with a retransmission request message packet received from the data receiver;
a prioritization processing step for specifying priority levels for the hierarchical layers generated by the hierarchization step based on an effect of loss during hierarchical encoding and a packet loss rate during transmitting, where a first hierarchical layer priority is set in an internet protocol (IP) header, and a second hierarchical layer priority is set in a realtime transport protocol (RTP) header;
a layer selection controlling step for selecting, in accordance with the hierarchy or priority, data to be processed on the basis of the network status;
a packet receiving step of receiving the data packets from the data sender;
an error correction controlling step of detecting an error or packet loss in the data packets received from the data sender and performing error-compliant processing;
a data-receiver-side network status monitoring step for monitoring the network status; and
a retransmission request controlling step of determining, on the basis of the detection of the error or packet loss in the data packets received from the data sender, whether to send the retransmission request message packet serving as a data packet retransmission request to the data sender, wherein the error correction controlling step includes a sending/reception step of sending an ECHO packet to the data sender and receiving an ECHO-REPLY packet in response to the ECHO packet in order to compute a round trip time (RTT) between the data sender and the data receiver, and a determination step of determining, on the basis of the RTT computed based on the ECHO packet, whether reception of a retransmitted data packet in response to the retransmission request is feasible prior to the start of reading data stored in the retransmitted data packet.

23. A data communications method according to claim 22, wherein the data sender-side controlling step changes, on the basis of the network status monitored in the network status monitoring step, the processing mode of forward error correction (FEC) serving as error control or the processing mode of automatic repeat request (ARQ) serving as data retransmission request processing.

24. A data communications method according to claim 22, wherein the network status monitoring step analyzes the network status on the basis of a packet loss rate, transmission delay time, or the retransmission request from the data receiver, and the data-sender-side controlling step controls the error control mode for the transmitted packets on the basis of the analysis result.

25. A data communications method according to claim 22, further comprising the steps of performing network status monitoring for analyzing the network status on the basis of a packet loss rate or transmission delay time and selecting data to be processed on the basis of the monitoring result.

26. A data communications method according to claim 22, wherein the error correction controlling step performs error correction based on forward error correction (FEC) serving as error control or automatic repeat request (ARQ) serving as data retransmission request processing.

27. A data communications method according to claim 22, wherein the data-sender-side controlling step changes the hierarchization mode or the prioritization mode in accordance with the network status.

28. A data communications method according to claim 22, further includes a hierarchization step of organizing encoded data to he sent into hierarchical layers, and wherein the data-sender-side controlling step changes, on the basis of the network status, the processing mode of forward error correction (FEC) serving as error control or the processing mode of automatic repeat request (ARQ) serving as data retransmission request processing in accordance with each of the hierarchical layers.

29. A data communications method according to claim 22, further comprising:
a prioritization processing step of specifying priority levels for the hierarchical layers generated in the hierarchization step, and
wherein the data-sender-side controlling step changes, on the basis of the network status, the processing mode of forward error correction (FEC) serving as error control or the processing mode of automatic repeat request (ARQ) serving as data retransmission request processing in accordance with each of the priority levels.

30. A data communications method according to claim 22, wherein the first hierarchical layer has a different number of priority levels from the second hierarchical layer.

31. A data communications system according to claim 22, wherein the FEC processor performs interleaving for enhancing error resilience.

32. A computer-readable storage medium containing executable code that when executed cause a data sender to perform steps for sending streaming data, the steps comprising:
an adding step for adding error-correcting redundant code to data to be sent using forward error correction (FEC);
a packet sending step of sending data packets containing the data to be sent to an RTP packet generator;
a network status monitoring step of monitoring the network status of a network between the data sender and a data receiver;
a hierarchization step for organizing encoded data to be sent into hierarchical layers; a control step of controlling an error control mode for the transmitted packets and a bit-rate by controlling the encoding mode during the hierarchization step, based on the network status monitored in the network status monitoring step and priority levels associated with the hierarchical layers generated by the hierarchization step;
a retransmission controlling step of extracting a data packet to be retransmitted in accordance with a retransmission request message packet received from the data receiver;
and a prioritization processing step for specifying priority levels for the hierarchical layers generated by the hierarchization step based on an effect of loss during the hierarchical step and a packet loss rate during transmitting, where a first hierarchical layer priority is set in an internet protocol (IP) header, and a second hierarchical layer priority is set in a realtime transport protocol (RTP) header.

33. A computer program according to claim 32, wherein the first hierarchical layer has a different number of priority levels from the second hierarchical layer.

34. A computer program according to claim 32, wherein the FEC processor performs interleaving for enhancing error resilience.

35. A computer-readable storage medium containing executable code that when executed cause a data receiver to perform steps for receiving streaming data, the steps comprising:
an adding step for adding error-correcting redundant code to data to be sent using forward error correction (FEC);
a packet sending step of sending data packets containing the data to be sent to an RTP packet generator;
a packet receiving step of receiving data packets from a data sender;
an error correction controlling step of detecting an error or packet loss in the data packets received from the data sender and performing error-compliant processing;
a retransmission request controlling step of determining, on the basis of the detection of the error or packet loss in the data packets received from the data sender, whether to send a retransmission request message packet serving as a data packet retransmission request to the data sender; and
a layer selection controlling step of selecting, in accordance with a hierarchy or priority, where a first hierarchical level priority is set in a internet protocol (IP) header, and a second hierarchical layer priority is set in a realtime transport protocol (RTP) header, data to be processed on the basis of the monitoring result in the network status monitoring unit, wherein the data is associated with one of a plurality of layers of data, wherein an information item is represented by each of the layers of data, each of the layers of data representing the information item at different levels of data compression and wherein selecting the data includes selecting the layer of data associated with the data.

36. A computer program according to claim 35, wherein the first hierarchical layer has a different number of priority levels from the second hierarchical layer.

37. A data communications system for performing streaming data transmission, comprising:
a data sender; and
a data receiver, wherein the data sender includes,
a forward error correction (FEC) processor for adding error-correcting redundant code to data to be sent, the data to be sent outputted to an RTP packet generator;
a packet sending processor for sending data packets containing the data to be sent;
a network status monitoring unit for monitoring the network status of a network between the data sender and the data receiver;
a data-sender-side controller for controlling an error control mode for the transmitted packets and a bit-rate by controlling the encoding mode during the hierarchization step, based on the network status monitored by the network status monitoring unit and priority levels associated with the hierarchical layers generated by the hierarchization step;
a retransmission controller for extracting a data packet to be transmitted in accordance with a retransmission request message packet received from the data receiver;
a hierarchization unit for organizing encoded data to be sent into hierarchical layers;
a prioritization processor for specifying priority levels for the hierarchical layers generated by the hierarchization unit based on an effect of loss during the hierarchical step and a packet loss rate during transmitting;
wherein the prioritization processor changes the priority levels of each of the hierarchical layers according to the network status monitored by the network status monitoring unit; and
wherein the data receiver includes, a packet reception processor for receiving the data packets from the data sender; a data-receiver-side network status monitoring unit for monitoring the network status;
an error correction controller for detecting an error or packet loss in the data packets received from the data sender and performing error-compliant processing;
a retransmission request controller for determining, on the basis of the detection of the error or packet loss in the data packets received from the data sender, whether to send the retransmission request message packet serving as a data packet retransmission request to the data sender; and
a layer selection controller for selecting, in accordance with the hierarchy or priority, data to be processed on the basis of an analysis result by the data-receiver-side network status monitoring unit.

38. A data communications method for performing streaming data transmission between a data sender and a data receiver, comprising:
an adding step for adding error-correcting redundant code to data to be sent using forward error correction (FEC);
a packet sending step of sending data packets containing the data to be sent to an RTP packet generator;
a network status monitoring step of monitoring the network status;
a hierarchization step of organizing encoded data to be sent into hierarchical layers, wherein an information item is represented by each of the layers, each of the layers of data representing the information item at different levels of data compression;
a data-sender-side controlling step of dynamically changing controlling an error control mode for processing data packets to be transmitted the transmitted packets and a bit-rate by controlling the encoding mode during the hierarchization step, based on the network status monitored in the network status monitoring step and priority levels associated with the hierarchical layers generated by the hierarchization step; and
a retransmission controlling step of extracting a data packet to be retransmitted in accordance with a retransmission request message packet received from the data receiver;
a prioritization processing step for specifying priority levels for the hierarchical layers generated by the hierarchization step based on an effect of loss during the hierarchical step and a packet loss rate during transmitting, including changing the priority levels of each of the hierarchical layers according to the network status monitored in the network status monitoring step;
a layer selection controlling step for selecting, in accordance with the hierarchy or priority, data to be processed on the basis of the network status;
a packet receiving step of receiving the data packets from the data sender;
an error correction controlling step of detecting an error or packet loss in the data packets
received from the data sender and performing error-compliant processing; a data-receiver-side network status monitoring step for monitoring the network status; and
a retransmission request controlling step of determining, on the basis of the detection of the error or packet loss in the data packets received from the data sender, whether to send the retransmission request message packet serving as a data packet retransmission request to the data sender,
wherein the error correction controlling step includes a sending/reception step of sending an ECHO packet to the data sender and receiving an ECHO-REPLY packet in response to the ECHO packet in order to compute a round trip time (RTT) between the data sender and the data receiver, and a determination step of determining, on the basis of the RTT computed based on the ECHO packet, whether reception of a retransmitted data packet in response to the retransmission request is feasible prior to the start of reading data stored in the retransmitted data packet.

39. A data sender for sending streaming data, comprising:
a forward error correction (FEC) processor adding error-correcting redundant code to the data to be sent, the data to be sent outputted to an RTP packet generator;
a packet sending processor for sending data packets containing the data to be sent;
a network status monitoring unit for monitoring the network status of a network between the date sender and a data receiver;
a hierarchization unit for organizing encoded data to be sent into hierarchical layers; a data-sender-side controller for controlling an error control mode for the transmitted packets step and priority levels associated with the hierarchical layers generated by the hierarchization step, based on the network status monitored by the network status monitoring unit and priority levels associated with the hierarchical layers generated by the hierarchization step;

a retransmission controller for extracting a data packet to be retransmitted in accordance with a retransmission request message packet received from the data receiver; and a prioritization processor for specifying priority levels for the hierarchical layers generated by the hierarchization unit based on an effect of loss during the hierarchical step and a packet loss rate during transmitting, wherein the prioritization processor changes the priority levels of each of the hierarchical layers according to the network status monitored by the network status monitoring unit.

* * * * *